US012610328B2

(12) United States Patent
Lim et al.

(10) Patent No.: US 12,610,328 B2
(45) Date of Patent: Apr. 21, 2026

(54) MAXIMUM SENSITIVITY DEGRADATION

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Jaehyuk Jang, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 313 days.

(21) Appl. No.: 18/567,320

(22) PCT Filed: Jun. 7, 2022

(86) PCT No.: PCT/KR2022/007968
§ 371 (c)(1),
(2) Date: Dec. 5, 2023

(87) PCT Pub. No.: WO2022/260381
PCT Pub. Date: Dec. 15, 2022

(65) Prior Publication Data
US 2024/0276400 A1     Aug. 15, 2024

(30) Foreign Application Priority Data

Jun. 7, 2021     (KR) ......................... 10-2021-0073481
Oct. 20, 2021     (KR) ......................... 10-2021-0139850

(51) Int. Cl.
H04W 24/02     (2009.01)
H04L 5/00     (2006.01)
(Continued)

(52) U.S. Cl.
CPC ........... H04W 52/367 (2013.01); H04L 5/001 (2013.01); H04L 5/14 (2013.01)

(58) Field of Classification Search
None
See application file for complete search history.

(56) References Cited

U.S. PATENT DOCUMENTS 8,929,900 B2 *   1/2015   Jones ................... H04L 5/1438
                                                         370/321
10,361,736 B2 *   7/2019   Lim ........................ H03H 1/00
(Continued)

FOREIGN PATENT DOCUMENTS

EP          3054619          3/2020
WO     2020197129          10/2020

OTHER PUBLICATIONS

European Patent Office Application Serial No. 22820509.2, Search Report dated Feb. 28, 2025, 10 pages.

*Primary Examiner* — Tuan A Tran
(74) *Attorney, Agent, or Firm* — LEE, HONG, DEGERMAN, KANG & WAIMEY

(57) ABSTRACT

There is provided a UE in a wireless communication system, the UE comprising: at least one transceiver, at least one processor; and at least one computer memory storing instructions that, based on being executed by the at least one processor, perform operations comprising: receiving a capability enquiry message from a serving cell; transmitting a capability information to the serving cell, based on that the capability enquiry message is received; and transmitting an uplink signal based on first CC within a NR TDD operating band; and receiving a downlink signal based on second CC within NR TDD operating band.

13 Claims, 24 Drawing Sheets

1

(51) Int. Cl.
  *H04L 5/14*          (2006.01)
  *H04W 52/36*        (2009.01)

(56)                    References Cited

U.S. PATENT DOCUMENTS

| 10,404,314 | B2 * | 9/2019  | Lim  | H04W 28/0236 |
|---|---|---|---|---|
| 10,560,143 | B2 * | 2/2020  | Zeng | H04W 52/365 |
| 10,660,098 | B2 * | 5/2020  | Lim  | H04L 5/001 |
| 10,925,092 | B2 * | 2/2021  | Pu   | H04W 28/0294 |
| 11,133,839 | B2 * | 9/2021  | Zeng | H04W 52/365 |
| 11,259,313 | B2 * | 2/2022  | Li   | H04W 76/16 |
| 11,336,406 | B2 * | 5/2022  | Park | H04B 17/3912 |
| 11,363,598 | B2 * | 6/2022  | Lim  | H04L 5/003 |
| 11,516,867 | B2 * | 11/2022 | Hu   | H04W 72/0453 |
| 11,540,280 | B2 * | 12/2022 | Lim  | H04W 72/0453 |
| 11,564,138 | B2 * | 1/2023  | Chen | H04W 36/10 |
| 11,818,081 | B2 * | 11/2023 | Choi | H04W 72/0446 |
| 11,838,975 | B2 * | 12/2023 | Zeng | H04W 72/0453 |
| 12,035,400 | B2 * | 7/2024  | Lim  | H04W 76/16 |
| 12,075,523 | B2 * | 8/2024  | Ng   | H04W 24/02 |
| 12,177,918 | B2 * | 12/2024 | Zeng | H04W 72/0453 |
| 2017/0019243 | A1 | 1/2017  | Ahn et al. | |
| 2018/0049202 | A1 | 2/2018  | Lim et al. | |

* cited by examiner

Figure 2:
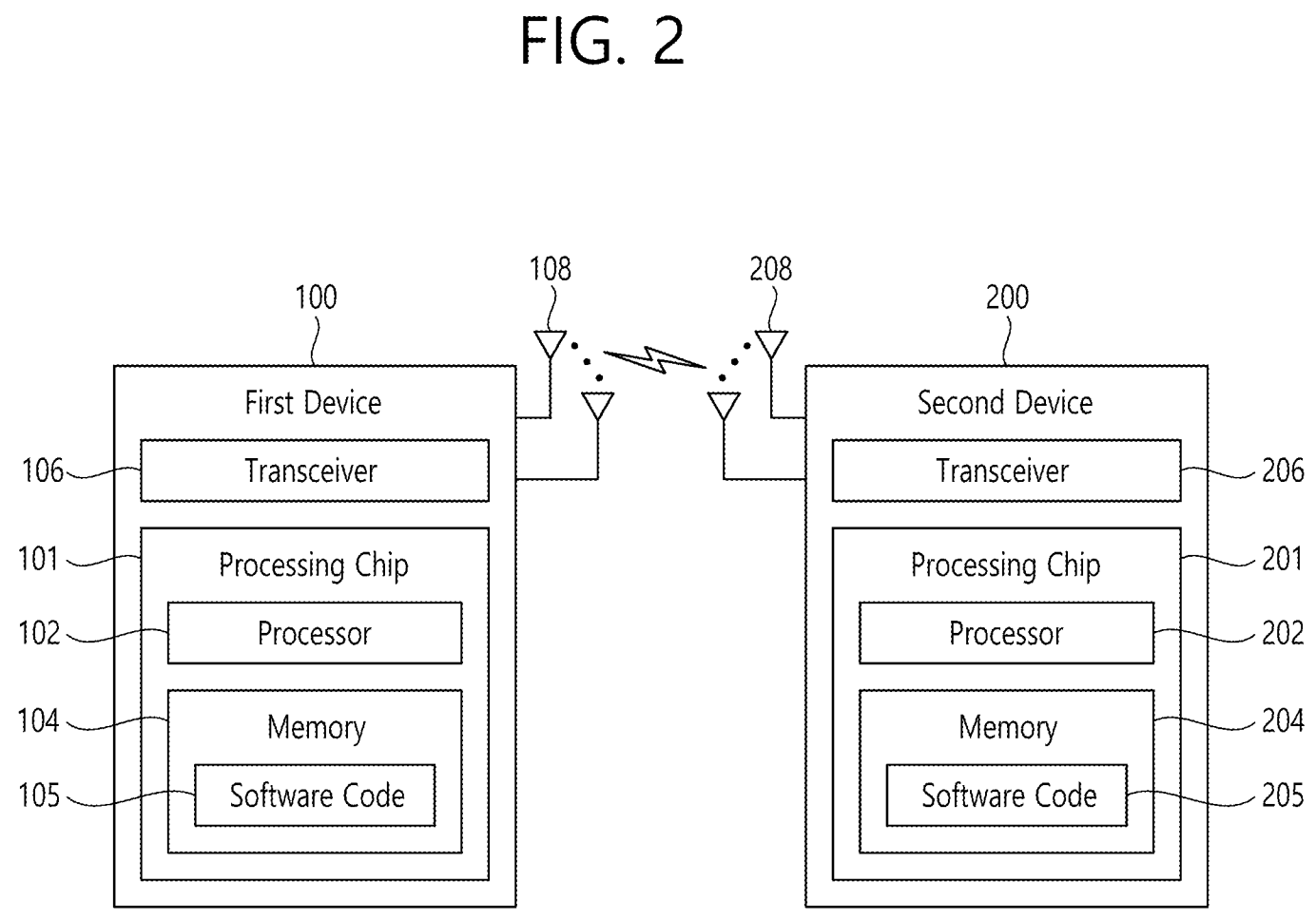

First Device — 100

Transceiver — 106

Processing Chip — 101

Processor — 102

Memory — 104

Software Code — 105

108

208

Second Device — 200

Transceiver — 206

Processing Chip — 201

Processor — 202

Memory — 204

Software Code — 205

FIG. 3

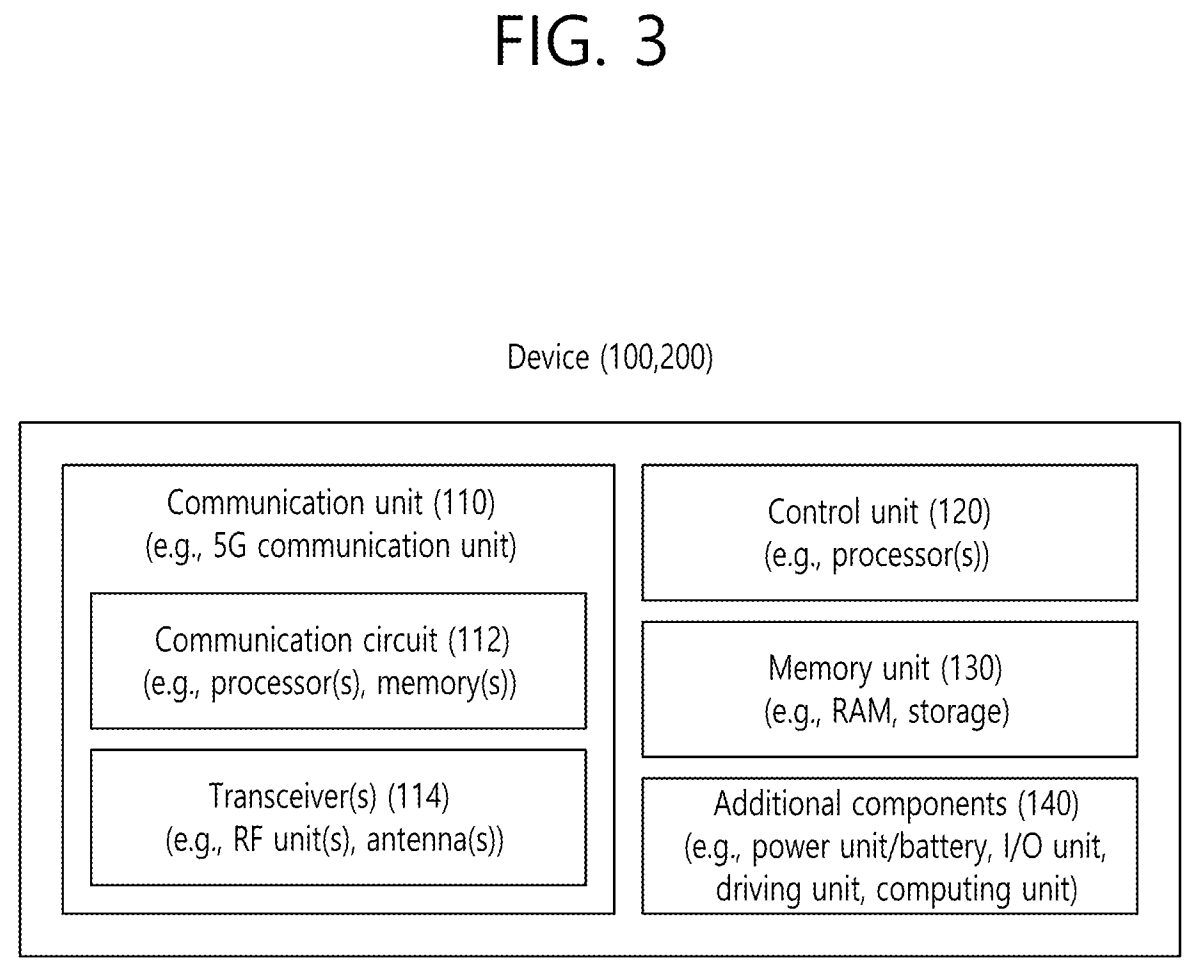

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

Intra BAND

FIG. 8
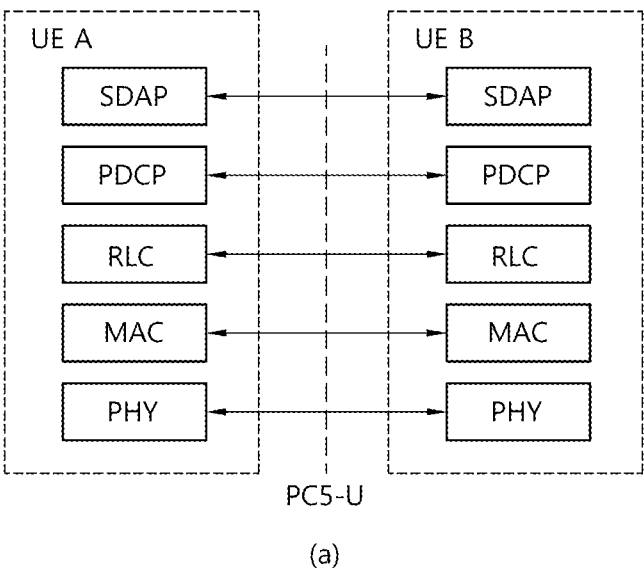
(a)
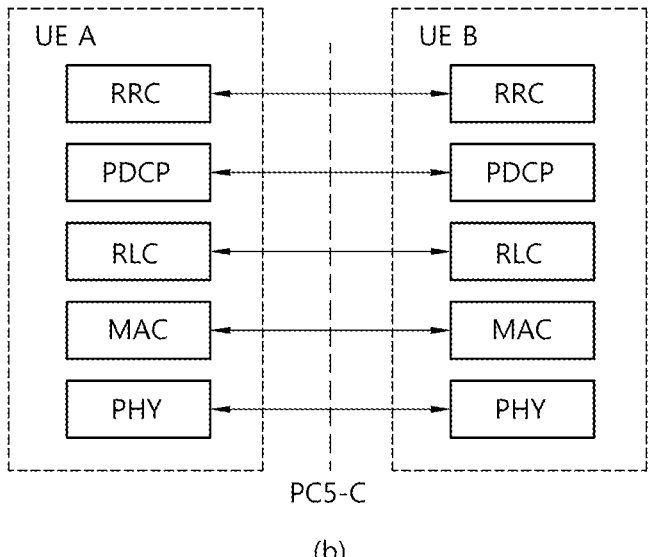
(b)

FIG. 9
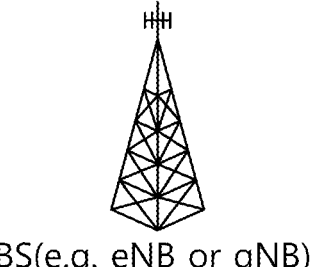
BS(e.g. eNB or gNB)
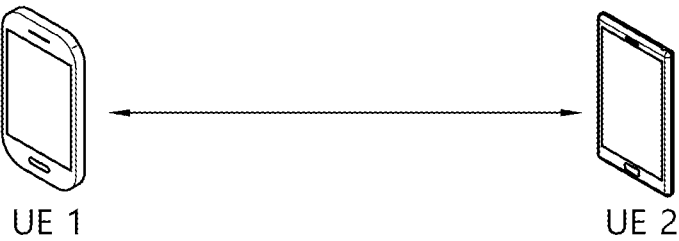
UE 1                                    UE 2

FIG. 12

| B12 PA characteristics | | |
|---|---|---|
| | Freq offset [MHz] | Noise power [dBm/Hz] |
| Ref Point(716MHz) | 30M | -129 |
| | 153M | -139 |
| | 684M | -148 |
| | 858M | -152 |
| B5 PA characteristics | | |
| | Freq offset [MHz] | Noise power [dBm/Hz] |
| Ref Point(849MHz) | 45M | -131 |
| | 511M | -151 |
| B8 PA characteristics | | |
| | Freq offset [MHz] | Noise power [dBm/Hz] |
| Ref Point(915MHz) | 45M | -132 |
| | 485M | -151 |
| B13 PA characteristics | | |
| | Freq offset [MHz] | Noise power [dBm/Hz] |
| Ref Point(787MHz) | 82M | -131 |
| | 613M | -151 |
| B42 PA characteristics | | |
| | Freq offset [MHz] | Noise power [dBm/Hz] |
| Ref Point(3800MHz) | 700M | -133 |
| | 1100M | -155 |

FIG. 16

| Parameter | Symbol | Values | | Unit | Note/Test Condition |
|---|---|---|---|---|---|
| | | Min. | Max. | | |
| Supply voltage | $V_{CC}$ | -0.3 | 3.6 | V | |
| Supply current | $I_{CC}$ | | 10 | mA | |
| Pin voltage | $V_{PIN}$ | -0.3 | $V_{CC}$ +0.3 | V | All pins except RF input pin |
| Pin voltage RF Input Pin | $V_{RFIN}$ | -0.3 | 0.9 | V | |
| RF input power | $P_{RFIN}$ | | 4 | dBm | |
| Junction temperature | $T_J$ | | 150 | °C | |
| Ambient temperature range | $T_A$ | -30 | 85 | °C | |
| Storage temperature range | $T_{stg}$ | -65 | 150 | °C | |

MAXIMUM SENSITIVITY DEGRADATION

CROSS-REFERENCE TO RELATED APPLICATIONS

This application is the National Stage filing under 35 U.S.C. 371 of International Application No. PCT/KR2022/007968, filed on Jun. 7, 2022, which claims the benefit of earlier filing date and right of priority to Korean Patent Application Nos. 10-2021-0073481, filed on Jun. 7, 2021, and 10-2021-0139850, filed on Oct. 20, 2021, the contents of which are all incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In the current inter-band Time Division Duplexing (TDD) operation, simultaneous Rx/Tx capability was defined according to a band combination in which interference must be reduced by matching the UL/DL configuration of the User Equipment (UE) to the same.

However, in the intra-band, in the current real field, in order to minimize inter-terminal interference between base stations and UEs, the operation is limited to use the same UL/DL configuration for all UEs.

If operating bands, such as operating band n77 or n79, supports a wide operating frequency range, each carrier can be operated far apart from each other. In this case, interference between each carrier can be reduced through a filter. In this case, interference problems may not occur even if restricted UL/DL configuration is not used. However, conventionally, simultaneous Rx/Tx operation was not defined for this case. Thus, frequency inefficiency occurs and resources are wasted.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present disclosure, a disclosure of the present specification provides a UE in a wireless communication system, the UE comprising: at least one transceiver; at least one processor; and at least one computer memory storing instructions that, based on being executed by the at least one processor, perform operations comprising: receiving a capability enquiry message from a serving cell; transmitting a capability information to the serving cell, based on that the capability enquiry message is received; and transmitting an uplink signal based on first CC within a NR TDD operating band; and receiving a downlink signal based on second CC within NR TDD operating band.

In accordance with an embodiment of the present disclosure, a disclosure of the present specification provides a method for performing communication, the method performed by a UE. The method comprises: receiving a capability enquiry message from a serving cell; transmitting a capability information to the serving cell, based on that the capability enquiry message is received; and transmitting an uplink signal based on first CC within a NR TDD operating band; and receiving a downlink signal based on second CC within NR TDD operating band.

In accordance with an embodiment of the present disclosure, a disclosure of the present specification provides a device operating in a wireless communication system, the device comprising: at least processor, at least one computer memory operably connectable to the at least one processor, wherein the at least one processor is configured to perform operations comprising: obtaining a capability enquiry message; generating a capability information, based on that the capability enquiry message is obtained; and generating an uplink signal based on first CC within a NR TDD operating band; and obtaining a downlink signal based on second CC within NR TDD operating band.

In accordance with an embodiment of the present disclosure, a disclosure of the present specification provides At least one computer readable medium (CRM) storing instructions that, based on being executed by at least one processor, perform operations comprising: obtaining a capability enquiry message; generating a capability information, based on that the capability enquiry message is obtained; and generating an uplink signal based on first CC within a NR TDD operating band; and obtaining a downlink signal based on second CC within NR TDD operating band.

According to a disclosure of the present disclosure, the above problem of the related art is solved.

Rx/Tx operating based on TDD operating band may be performed efficiently and/or precisely. For example, simultaneous Rx/Tx operation is efficiently supported based on MSD values, capability information, deployment scenarios, and/or RF components. For example, frequency efficiency is achieved for simultaneous Rx/Tx operation and resources can be efficiently used. For example, interference between carriers may not cause a significant problem. In this case, if simultaneous Rx/Tx capability is configured for the wide band such as n77 and n79, the frequency efficiency of the system becomes very good, and resources can be used flexibly.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF DRAWINGS

FIG. 1 shows an example of a communication system to which implementations of the present disclosure is applied.

FIG. 2 shows an example of wireless devices to which implementations of the present disclosure is applied.

FIG. 3 shows an example of a wireless device to which implementations of the present disclosure is applied.

FIG. 8 shows a radio protocol architecture for a SL communication, based on an embodiment of the present disclosure.

FIG. 9 shows a UE performing V2X or SL communication, based on an embodiment of the present disclosure.

FIG. 12 shows an example of PA Rx noise level characteristics in FDD bands.

FIG. 16 shows an example of absolute maximum rating for LNA.

DETAILED DESCRIPTION

Figure 4A:
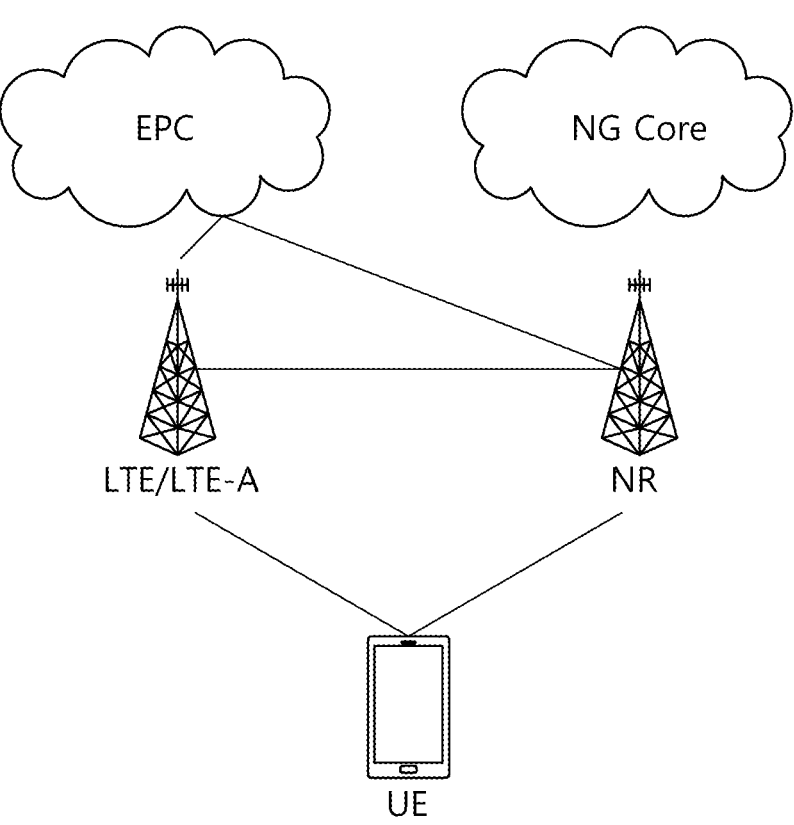
FIGS. 4a to 4c are diagrams illustrating exemplary architecture for a next-generation mobile communication service.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
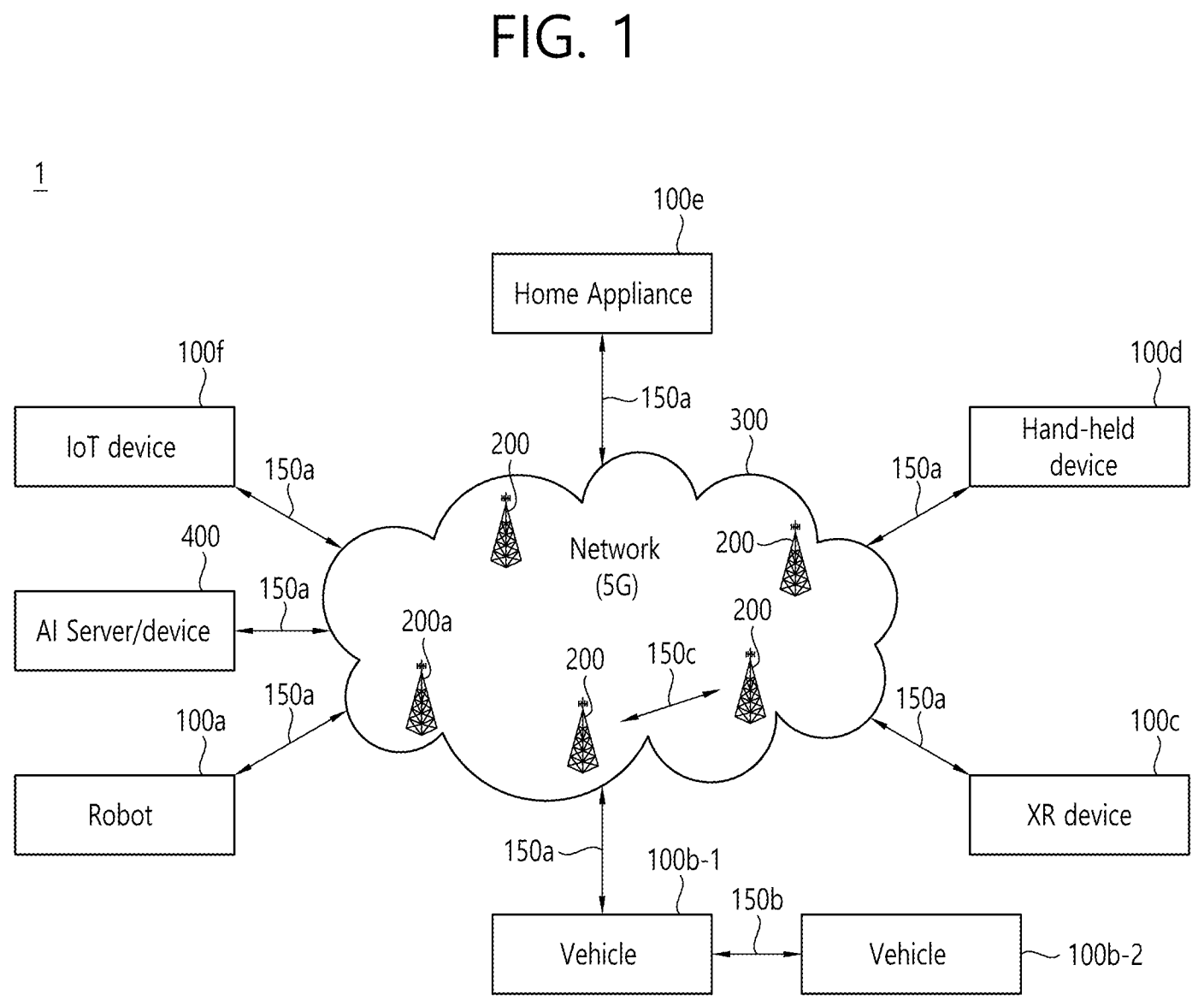

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with re-constructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 KHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FRI may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FRI may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/ portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Dual Connectivity (DC)>

Recently, a scheme for simultaneously connecting UE to different base stations, for example, a macro cell base station and a small cell base station, is being studied. This is called dual connectivity (DC).

For example, when DC is configured in E-UTRA, the following exemplary description may be applied.

In DC, the eNodeB for the primary cell (PCell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (PCell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 4B:
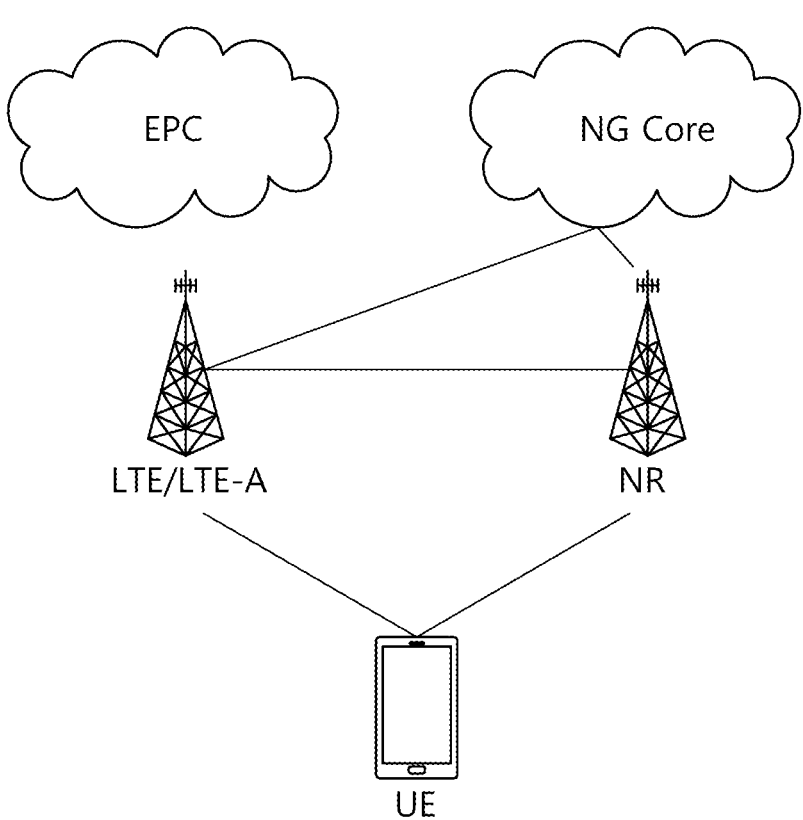
Figure 4C:
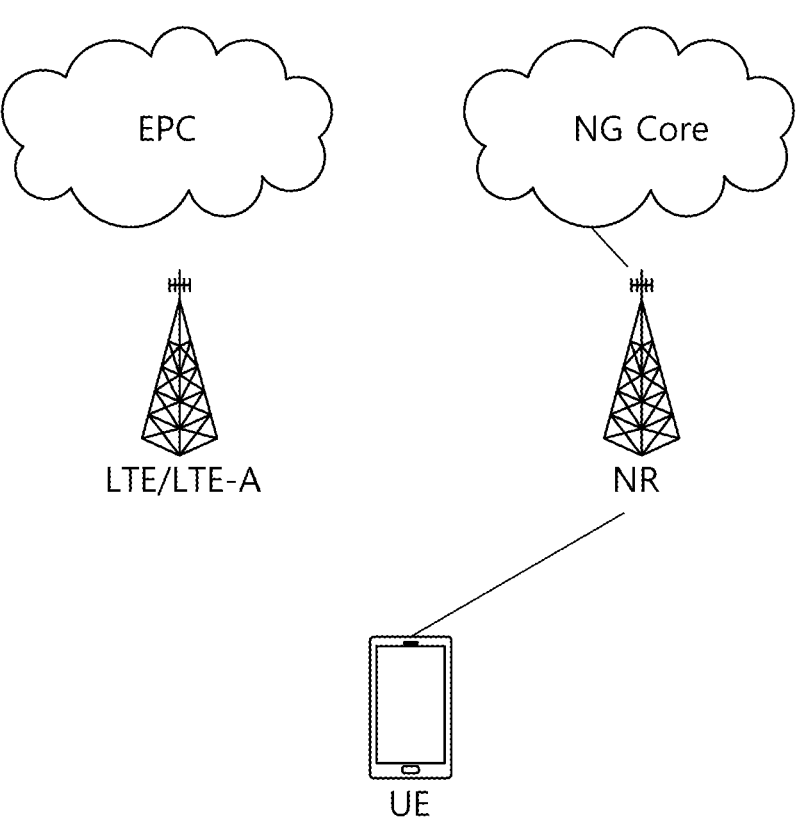

FIGS. 4a to 4c are diagrams illustrating exemplary architecture for a next-generation mobile communication service.

Referring to FIG. 4a, a UE is connected in dual connectivity (DC) with an LTE/LTE-A cell and a NR cell.

The NR cell is connected with a core network for the legacy fourth-generation mobile communication, that is, an Evolved Packet core (EPC). In example shown in FIG. 4a, the UE is configured with EN-DC(E-UTRA-NR DC). The UE, which is configured with EN-DC, is connected with an E-UTRA (that is, LTE/LTE-A) cell and an NR cell. Here, a PCell in EN-DC may be an E-UTRA (that is, LTE/LTE-A) cell, and a PSCell in EN-DC may be an NR cell.

Referring to FIG. 4b, the LTE/LTE-A cell is connected with a core network for 5th generation mobile communication, that is, a Next Generation (NG) core network, unlike the example in FIG. 4a.

A service based on the architecture shown in FIGS. 4a and 4b is referred to as a non-standalone (NSA) service.

Referring to FIG. 4c, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

Figure 5:
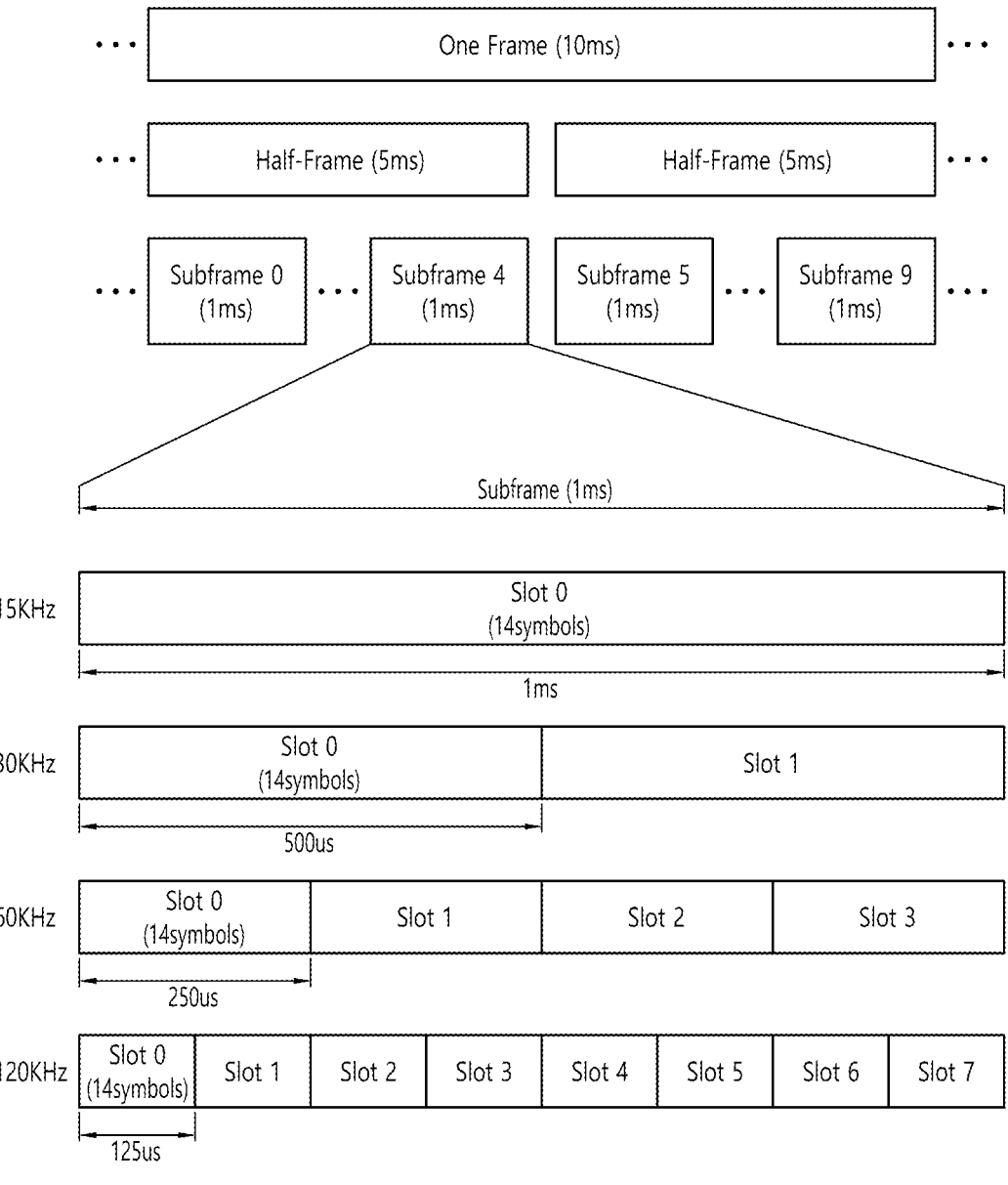
FIG. 5 shows a frame structure in a 3GPP based wireless communication system to which implementations of the present disclosure is applied.

FIG. 5 shows a frame structure in a 3GPP based wireless communication system to which implementations of the present disclosure is applied.

The frame structure shown in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 3

| u | $N^{slot}_{symb}$ | $N^{frame,\,u}_{slot}$ | $N^{subframe,\,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 4

| u | $N^{slot}_{symb}$ | $N^{frame,\,u}_{slot}$ | $N^{subframe,\,u}_{slot}$ |
|---|---|---|---|
| 2 | 12 | 40 | 4 |

<Operating Band in NR>

An operating band shown in Table 5 is a reframing operating band that is transitioned from an operating band of LTE/LTE-A. This operating band is referred to as FR1 band.

TABLE 5

| NR Operating Band | Uplink Operating Band $F_{UL\_low}$- $F_{UL\_high}$ | Downlink Operating Band $F_{DL\_low}$- $F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n24 | 1626.5 MHz-1660.5 MHz | 1525 MHz-1559 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |

TABLE 5-continued

| NR Operating Band | Uplink Operating Band $F_{UL\_low}$- $F_{UL\_high}$ | Downlink Operating Band $F_{DL\_low}$- $F_{DL\_high}$ | Duplex Mode |
|---|---|---|---|
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n85 | 698 MHz-716 MHz | 728 MHz-746 MHz | FDD |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |
| n97 | 2300 MHz-2400 MHz | N/A | SUL |
| n98 | 1880 MHz-1920 MHz | N/A | SUL |
| n99 | 1626.5 MHz-1660.5 MHz | N/A | SUL |

The following table shows an NR operating band defined at high frequencies. This operating band is referred to as FR2 band.

TABLE 6

| NR Operating Band | Uplink Operating Band $F_{UL\_low}$- $F_{UL\_high}$ | Downlink Operating Band $F_{DL\_low}$- $F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |
| n262 | 47200 MHz-48200 MHz | 47200 MHz-48200 MHz | TDD |

Meanwhile, when the operating band shown in the above table is used, a channel bandwidth is used as shown in the following table. For example, Table 7 shows an example of a maximum value of the cannel bandwidth.

TABLE 7

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

In the above table, SCS indicates a subcarrier spacing. In the above table, $N_{RB}$ indicates the number of RBs.

Meanwhile, when the operating band shown in the above Table 6 is used, a channel bandwidth is used as shown in the following table 8.

TABLE 8

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N/A |
| 120 | 32 | 66 | 132 | 264 |

In NR, E-UTRA (Evolved Universal Terrestrial Radio Access) operating bands may also be used for communication. E-UTRA operating bands may mean operating bands of LTE.

The following table is an example of E-UTRA operating bands.

TABLE 9

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |

TABLE 9-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD |
| 46 | 5150 MHz-5925 MHz | 5150 MHz-5925 MHz | TDD |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD |
| 50 | 1432 MHz-1517 MHz | 1432 MHz-1517 MHz | TDD |
| 51 | 1427 MHz-1432 MHz | 1427 MHz-1432 MHz | TDD |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A | 738 MHz-758 MHz | FDD |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD |
| 76 | N/A | 1427 MHz-1432 MHz | FDD |
| 85 | 698 MHz-716 MHz | 728 MHz-746 MHz | FDD |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additonal radio resouce.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Carrier aggregation may be classified into a continuous carrier aggregation in which aggregated carriers are continuous and a non-contiguous carrier aggregation in which aggregated carriers are separated from each other. In the following, carrier aggregation simply should be understood to include both the case where the component carrier (CC) is continuous and the case where it is discontinuous. The number of CCs aggregated between the downlink and the uplink may be set differently. A case in which the number of downlink CCs and the number of uplink CCs are the same may be referred to as symmetric aggregation, and a case in which the number of downlink CCs are different may be referred to as asymmetric aggregation.

On the other hand, carrier aggregation can also be classified into inter-band CA and intra-band CA. The inter-band CA is a method of aggregating and using each CC existing in different operating bands, and the intra-band CA is a method of aggregating and using each CC in the same operating band. In addition, the CA technology is more specifically, intra-band contiguous CA, intra-band non-contiguous CA and inter-band discontinuity. Non-Contiguous) CA.

Figure 6A:
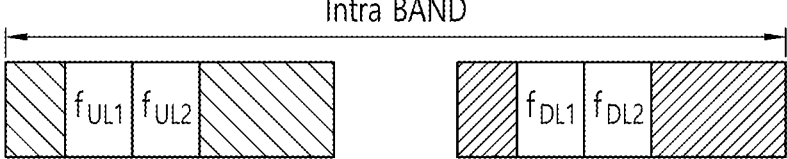
FIG. 6a illustrates a concept view of an example of intra-band contiguous CA.
Figure 6B:
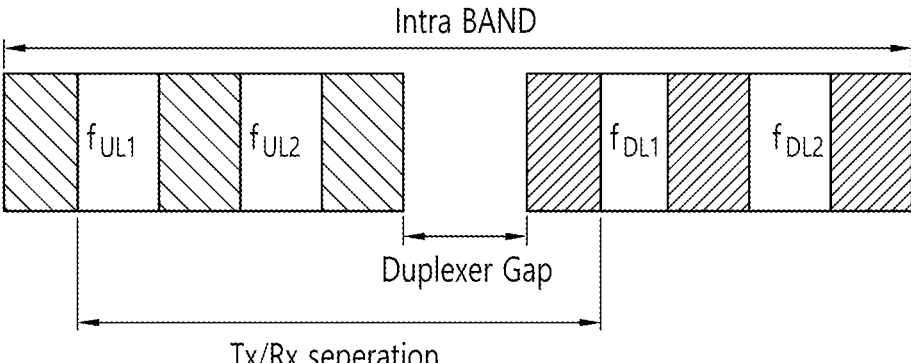
FIG. 6b illustrates a concept view of an example of intra-band non-contiguous CA.

FIG. 6a illustrates a concept view of an example of intra-band contiguous CA. FIG. 6b illustrates a concept view of an example of intra-band non-contiguous CA.

LTE-advanced adds various schemes including uplink MIMO and carrier aggregation in order to realize high-speed wireless transmission. The CA may be split into the intra-band contiguous CA shown in FIG. 6a and the intra-band non-contiguous CA shown in FIG. 6b.

Figure 7A:
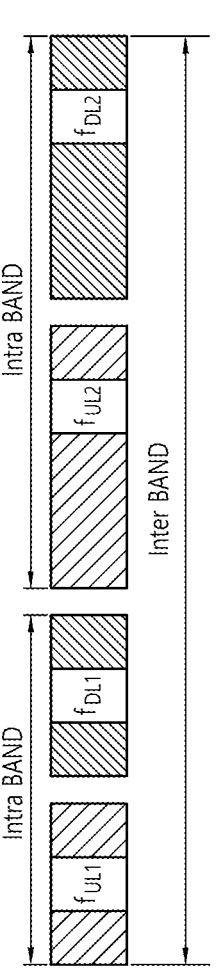
FIG. 7a illustrates a concept view of an example of a combination of a lower frequency band and a higher frequency band for inter-band CA.
Figure 7B:
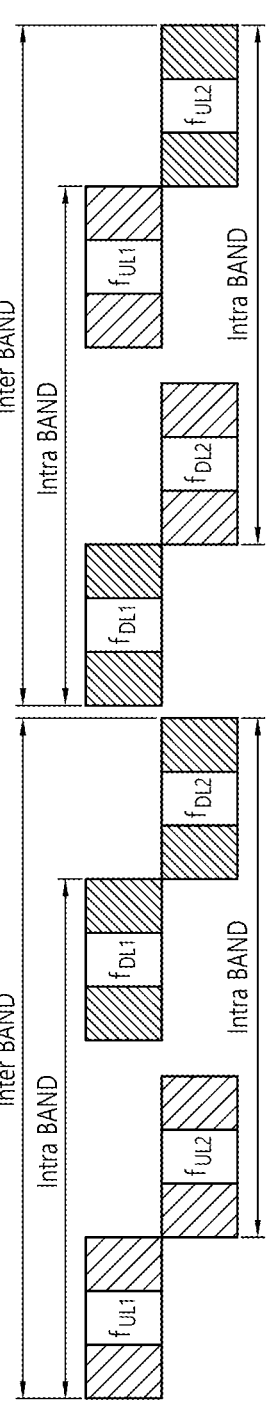
FIG. 7b illustrates a concept view of an example of a combination of similar frequency bands for inter-band CA.

FIG. 7a illustrates a concept view of an example of a combination of a lower frequency band and a higher frequency band for inter-band CA. FIG. 7b illustrates a concept view of an example of a combination of similar frequency bands for inter-band CA.

The inter-band carrier aggregation may be separated into inter-band CA between carriers of a low band and a high band having different RF characteristics of inter-band CA as shown in FIG. 7a and inter-band CA of similar frequencies that may use a common RF terminal per component carrier due to similar RF (radio frequency) characteristics as shown in FIG. 7b.

<V2X or SL Communication>

Hereinafter, Vehicle to Everything (V2X) or Sidelink (SL) communication will be described.

FIG. 8 shows a radio protocol architecture for a SL communication, based on an embodiment of the present disclosure.

The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

FIG. 9 shows a UE performing V2X or SL communication, based on an embodiment of the present disclosure.

The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE I may use a pre-configured resource pool.

In general, the resource pool may be configured in unit of a plurality of resources, and each UE may select a unit of one or a plurality of resources to use it in SL signal transmission thereof.

<Disclosure of the Present Specification>

In the current inter-band TDD operation, simultaneous Rx/Tx capability was defined according to a band combination in which interference must be reduced by matching the UL/DL configuration of the User Equipment (UE) to the same.

However, in the intra-band, in the current real field, in order to minimize inter-terminal interference between base stations and UEs, the operation is limited to use the same UL/DL configuration for all UEs.

If operating bands, such as operating band n77 or n79, supports a wide operating frequency range, each carrier can be operated far apart from each other. In this case, interference between each carrier can be reduced through a filter. In this case, interference problems may not occur even if restricted UL/DL configuration is not used. However, conventionally, simultaneous Rx/Tx operation was not defined for this case. Thus, frequency inefficiency occurs and resources are wasted.

Therefore, in the case of a UE capable of operating in such an environment, if the capability is configured to support simultaneous Rx/Tx operation in the same operating band, frequency efficiency will be greatly increased, and in order to enable UL resources not to be wasted, efficient 5G system operation may be possible.

In the present disclosure, to support simultaneous Rx/Tx capability in the same operating band, the noise level in the receiving band according to PA/RFIC transmission according to the frequency span between different carriers is analyzed. Then, the required MSD value according to the corresponding frequency gap is analyzed. If the corresponding MSD is allowed, simultaneous Rx/Tx capability can be supported. In addition to the frequency separation distance, the MSD may be improved by limiting the position of the uplink Resource Block (RB) or the number of RBs. And, more efficient MSD and MPR can be allowed by applying MPR according to the modulation order and RB configuration transmitted through the uplink. Through this, we propose a method capable of supporting simultaneous Rx/Tx capability.

In the current LTE/NR system, various functions or capabilities supported by different UEs are reported to the base station as UE capability. The base station may provide an optimal service to the corresponding UE based on the UE capability reported by the UE. This UE capability information reporting procedure may be performed by the request of the base station. The procedure for UE capability reporting in the current standard is as follows.

The following drawings are prepared to explain a specific example of the present specification. Since the names of specific devices or names of specific signals/messages/fields described in the drawings are provided by way of example, technical features of the present specification are not limited to specific names used in the following drawings.

Figure 10:
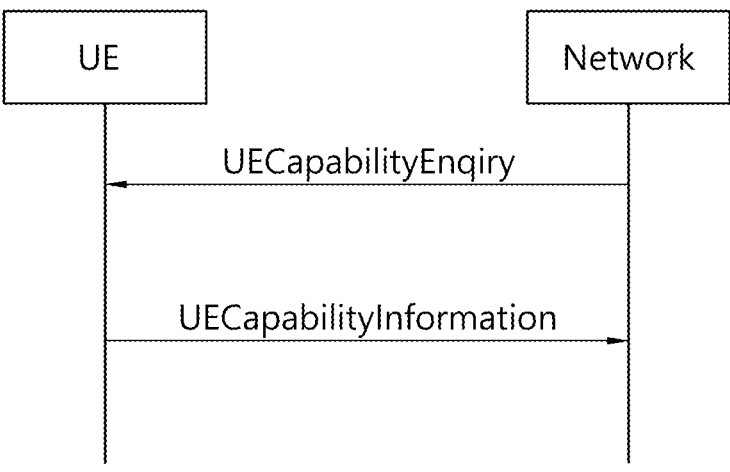
FIG. 10 shows an example of UE capability transfer procedure according to the present disclosure.

FIG. 10 shows an example of UE capability transfer procedure according to the present disclosure.

According to the example of FIG. 10, the network (e.g. a base station) may transmit capability enquiry message (e.g. UECapabilityEnquiry) to the UE. For example, the network initiates the procedure to a UE in RRC_CONNECTED state when the network needs (additional) UE radio access capability information. The network may request various UE capability information by transmitting capability enquiry message.

The UE may transmit a message including capability information of the UE. For example, the UE may transmit UECapabilityInformation message to the network. The UE may transmit various capability information by transmitting UECapabilityInformation message.

For example, in prior-art, simultaneous Rx/Tx capability for inter-band CA is defined as simultaneousRxTxInter-BandCA and included in the UEcapabilityInofrmation message. simultaneousRxTxInterBandCA may indicates whether the UE supports simultaneous transmission and reception in TDD-TDD and TDD-FDD inter-band NR CA. It is mandatory for certain TDD-FDD and TDD-TDD band combinations.

For example, in prior-art, simultaneous Rx/Tx capability for inter-band CA is defined as simultaneousRxTxInterBan-dENDC and included in the UEcapabilityInofrmation message. simultaneousRxTxInterBandENDC may indicates whether the UE supports simultaneous transmission and reception in TDD-TDD and TDD-FDD inter-band (NG)EN-DC/NE-DC. It is mandatory for certain TDD-FDD and TDD-TDD band combinations.

In the present disclosure, simultaneous Rx/Tx capability for intra-band CA UE may be defined as the following examples.

For example, simultaneous Rx/Tx capability for intra-band CA may defined as simultaneousRxTxIntraBandCA and may be included in in the UEcapabilityInofrmation message. simultaneousRxTxIntraBandCA may indicates whether the UE supports simultaneous transmission and reception in intra-band TDD non-contiguous (NC) CA. It is mandatory for a certain TDD intra-band CA combinations.

For example, simultaneous Rx/Tx capability for intra-band DC may defined as simultaneousRxTxIntraBan-dENDC and may be included in in the UEcapabilityInofr-mation message. simultaneousRxTxIntraBandENDC may indicates whether the UE supports simultaneous transmission and reception in TDD intra-band (NG)EN-DC/NE-DC. It is mandatory for a certain TDD intra-band DC band combinations.

For example, when the UE supports simultaneous Rx/Tx capability for intra-band concurrent operation based on Uu communication and V2X communication, simultaneous Rx/Tx capability for intra-band concurrent operation may defined as simultaneousRxTxIntraBand_concorrent operation. simultaneousRxTxIntraBand_concorrent operation may be included in the UEcapabilityInofrmation message or may be included in a capability information related to SL-parameter. The UE may transmit the capability information related to SL-parameter.

In order for terminals supporting intra-band CA operation and intra-band DC operation to support simultaneous Rx/Tx capability in a wide operating band such as n77/n79, it is necessary to solve various problems.

Hereinafter, simultaneous Rx/Tx capability may mean that the UE is capable of performing uplink transmission and downlink reception within the single TDD operating band such as n77 and/or n79.

That is, for a wide band such as n77 and n79, two different carriers can operate far apart. In this case, interference cancellation based on the separation distance between carriers may be possible. In addition, additional interference cancellation is possible through a method of applying additional A-MPR, a method of limiting uplink RB, and a CBW filter. Accordingly, according to these examples, interference between carriers may not cause a significant problem. In this case, if simultaneous Rx/Tx capability is configured for the wide band such as n77 and n79, the frequency efficiency of the system becomes very good, and resources can be used flexibly.

If such simultaneous Rx/Tx capability is allowed, operating while changing the UL/DL configuration according to the surrounding situation has a benefit in terms of the entire system.

More specifically, since there is no UE capability (eg, intra-band simultaneous Rx/Tx capability), all terminals in the same band must have the same UL/DL configuration according to the existing signaling procedure. However, if the corresponding capability is allowed, the UE may be guaranteed various UL/DL capabilities according to the environment. Accordingly, it is possible to maximize frequency efficiency through efficient operation of uplink/downlink of the UE.

Also, in NR SL, NR SL communication and NR Uu communication can be used simultaneously in different carriers with guaranteed frequency separation in the same band in a licensed band. Even in this case, the above simultaneous Rx/Tx capability can be configured In various examples of the present disclosure, discussion on existing problems to support simultaneous Rx/Tx capability in intra-band NC CA/DC UE may be explained. Herein, intra-band NC CA/DC UE may mean UE supporting intra-band NC CA operation and/or intra-band NC DC operation.

How to achieve the isolation levels in UE side and concerned operated in inter-operator deployed scenarios for simultaneous Rx/Tx capability in intra-band non-contiguous CA/DC UE needs to be discussed. So, examples of the present disclosure may provide the motivation on the simultaneous Rx/Tx capability and candidate deployment scenarios in FR1/FR2 and also propose how to achieve the reasonable isolation level in UE side.

For example, following issues may be handled. For example, Clarification points on the simultaneous Rx/Tx capability in intra-band NC-CA/DC UE. Self-desense problems from Tx interference into own reception in UE. Deployment scenarios & Use case.

In the present disclosure, it is provided that how to achieve the reasonable isolation level in Rx band and useful deployments scenarios and use cases for simultaneous Rx/Tx capability in intra-band NC-CA/DC UE.

1. First Example of the Present Disclosure 1-1. How to Mitigate the Self-Interference Problem The UE may perform simultaneous Rx/Tx operation within a single TDD operating band. Then, when the UE transmits UL signal within the single TDD operation band, the UL signal transmitted by the UE may affect signal reception performed by the UE.

Generally, REFSENS requirements are defined with UL configuration.

In Rx part, the dominant factor to define the REFSENS is the Rx noise level from the PA output.

The equation to specify the REFSENS requirements is as follow:

$$REFSENS = kTB + SNR +$$
$$10 \log_{10}\left(L_{CRB} * SCS * 12/RX\_BW\right) + (NF + IM) - \text{Diversity gain}$$

Where kTB: Thermal noise level is [−174 dBm(KT)+10*log$_{10}$ (RX BW)]dBm.

NF: Assumed NF is 9 dB when RX freqeuncy<3 GHz. NF is 10 dB when RX freqeuncy>=3 GHz (e.g B42, n77, n78, n79, . . . ) at licensed bands at FR1. For n77, 0.5 dB additional relaxation is allowed from NF of n78.

IM: 2.5 dB is assumed.

Target SNR: −1.0 dB

Diversity gain: 3 dB

Table 10 shows an example of REFSENS requirements for n77 band. REFSENS may refer to Reference sensitivity. For example, the UE should be configured to satisfy a reference sensitivity power level (REFSENS) which is the minimum average power for each antenna port of the UE when receiving the downlink signal. For example, the REFSENS may be set such that the downlink signal throughput of the UE is 95% or more of the maximum throughput of the reference measurement channel. When the impact occurs, there is a possibility that the downlink signal throughput is reduced to 95% or less of the maximum throughput.

TABLE 10

| NR band | n77 band Primary RX | Diversity Rx |
|---|---|---|
| C/N requirement (dB) | −1.0 | −1.0 |
| Total NF(IM + RF NF = 2.2 + 10.5) (dB) | 12.7 | 12.7 |
| Noise floor at Antenna connector(dBm/Hz) | −161.3 | −161.3 |
| Total RXBN at Antenna connector (dBm/Hz) | −161.3 | −161.3 |
| Sensitivity with RXBN (dBm/10 MHz CBW) | −92.3 | −92.3 |
| REFSENS After MRC | −95.3 (3GPP Refsens value) | |

Table 10 shows the example of REFSENS requirements in n77 based on 10 MHz Channel BandWidth (CBW) (SCS 15 kHz).

C/N(Carrier to Noise) requirement may mean target Signal to Noise Ratio (SNR). MRC may mean maximum-ratio combining.

NF(Noise Figure) may mean how much noise is added as a signal passes through a certain system or a certain circuit block. NF can be used to calculate receiving sensitivity and MSD(maximum sensitivity Degradation).

RXBN(Rx band noise) may mean noise level induced by the Rx band.

In the equation for REFSENS, the NF, IM and Diversity gain are common levels regardless of the self-interference problem. Also target SNR is the derived by link budget to guarantee the UE performance.

Example shown in Table 10 may be used as a reference for analyzing REFSENS requirements for simultaneous Rx/Tx operation within a single TDD operating band. Example shown in Table 10 was derived based on normal TDD operation other than the simultaneous Rx/Tx operation. Thus, Tx noise based on PA or RFIC did not affect Rx operation in Table 10.

Based on that Tx operation and Rx operation are performed simultaneously on CC1 and CC2 within TDD intra band, Tx noise level based on PA and/orRFCI needs to be considered as the following.

For example, The required thermal noise level in Rx part is −104 dBm for 10 MHz CBW. To achieve the −104 dBm/10 MHz, −125 dBm/Hz at PA &RFIC Rx noise level in FDD band are generally assumed respectively. In FDD band, the duplexer isolation was considered with 50 dB, then total noise level −122 dBm/Hz (PA+RFIC) noise level will be assumed as the thermal noise level −122−50=−172 dBm/Hz. Therefore, the REFSENS requirements can be determined with the above equation in FDD band according to CBW.

However, there was no expected the duplexer isolation level such as 50 dB isolation in TDD band.

So, if current Rx noise level as −122 dBm/Hz is considered in TDD band, then the expected the noise level at antenna connector may be calculated as −122−4 (RF FE IL)−10 dB (antenna isolation)=−136 dBm/Hz with the current Rx (PA+RFIC) noise level, as shown in Table 11. Herein, RF FE IL is Radio Frequency Front-End Implementation Loss.

Table 11 shows an example of expected desense level in operating band n77.

TABLE 11

| NR band | n77 band | | |
| | Primary RX | | Diversity Rx |
| --- | --- | --- | --- |
| C/N requirement (dB) | −1.0 | | −1.0 |
| Total NF(IM + RF NF = 2.2 + 10.5) (dB) | 12.7 | | 12.7 |
| Noise floor at Antenna connector(dBm/Hz) | −161.3 | | −161.3 |
| PA & RFIC RX Band Noise level at Antenna connector (dBm/Hz) | −136.0 | (−122 dBm/ Hz(PA + RFIC RxBN) − FEIL(4 dB) − Ant ISO(10 dB)) | −136.0 |
| Total RXBN at Antenna connector (dBm/Hz) | −136.0 | | −136.0 |
| Sensitivity with RXBN (dBm/10 MHz CBW) | −67.0 | | −67.0 |
| REFSENS After MRC | −70.0 | 25.3 dB De-sense level from −95.3 dBm of Table 10 | |

Ant ISO may mean Antenna isolation value.

Table 11 shows an example of Expected Desense level in operation band n77 based on 10 MHz CBW (SCS 15 kHz).

As shown in the example of Table 11, REFSENS after MRC is −70 dBm. Based on Table 11, 25.3 dB of De-sense level was applied to −95.3 dBm of Table 10.

Table 10 shows an example based on non-simultaneous Tx operation and Rx operation. In contrast, the example of Table 11 shows de-sense level based on simultaneous intra-band Tx/Rx operation. Based on that de-sense level of 25.3 dB is relatively big, frequency gap may be considered to decrease the de-sense level as shown in examples of Table 12 and Table 13.

Therefore, 25.3 dB MSD is expected in n77 TDD band, the simultaneous Rx/Tx capability for intra-band NC-CA/DC UE is applied with maximum Tx power.

Observation 1: 25.3 dB MSD is expected in n77 TDD band, when total noise level with −122 dBm (PA+RFIC) was considered without duplexer isolation.

The following figure is the PA noise level characteristics according to the frequency gap in B12. B12 may mean E-UTRA operating band 12.

The following drawings are prepared to explain a specific example of the present specification. Since the names of specific devices or names of specific signals/messages/fields described in the drawings are provided by way of example, technical features of the present specification are not limited to specific names used in the following drawings.

Figure 11:
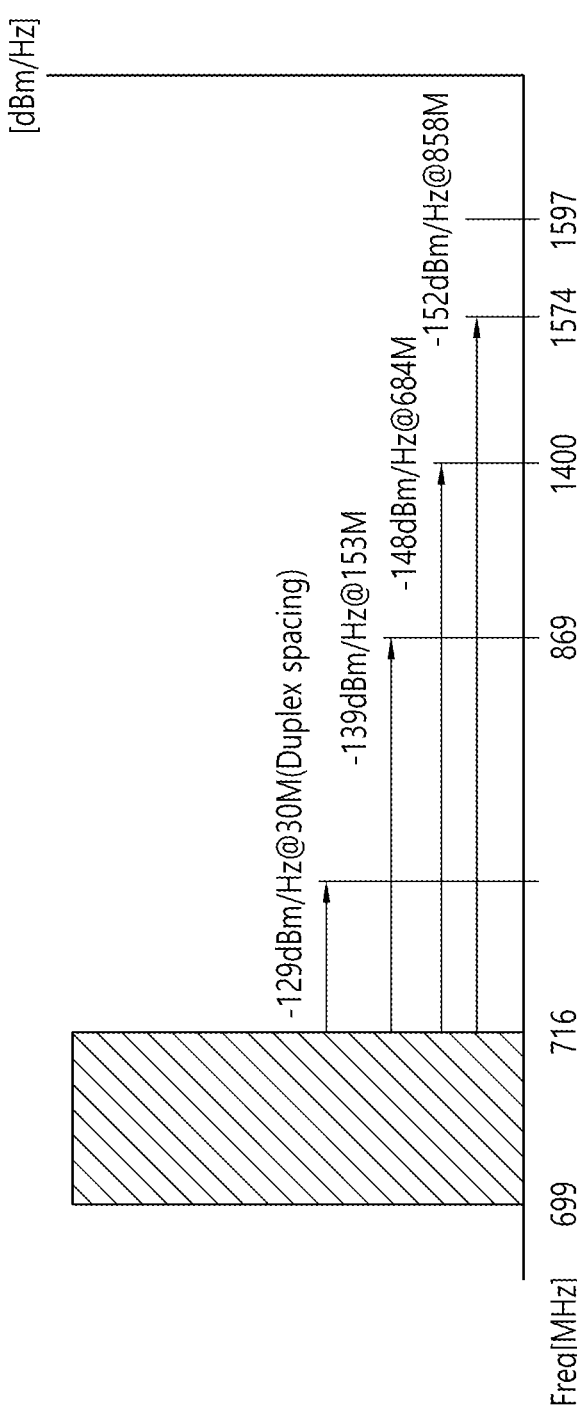
FIG. 11 shows an example of PA Rx noise level according to the frequency gap in B12.

FIG. 11 shows an example of PA Rx noise level according to the frequency gap in B12.

FIG. 11 shows an example of PA Rx noise due to duplexer spacing values which indicates frequency spacing from upper edge of configured transmission band which is from 699 MHz to 716 MHz. In FIG. 11, −129 dBm/Hz@30M may mean that PA noise level for receiving signal is −129 dBm/Hz for a frequency position 30 MHz bigger than 716 MHz.

According to FIG. 11, it is seen that the common PA noise level is −129 dBm/Hz in B12 with 30 MHz frequency gap. And also it is seen that the lower PA noise level when the frequency gap is larger than 30 MHz in Band 12 in FIG. 11.

In FIG. 11, it may be seen the −139 dBm/Hz PA noise level when the frequency gap is 153 MHz from the Tx frequency band. Also −148 dBm/Hz PA noise level is observed when the he frequency gap is 684 MHz guaranteed.

The noise level according to the frequency gap from the Tx band is summarized as shown in examples of FIG. 12.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 12 shows an example of PA Rx noise level characteristics in FDD bands.

In examples of FIG. 12, Ref point may mean upper edge of configured Tx band. Freq offset may mean frequency offset from the upper edge of the configured Tx band. Noise power may mean PA Rx noise level for the frequency position which corresponds to a frequency position derived by adding Freq offset and Ref point.

For example, for B13, when Ref point is 787 MHz and Freq offset is 613 MHz, PA Rx noise level is −151 dBm/Hz.

Based on the PA noise levels in FIG. 12, the followings may be observed:

Observation 2: The noise level can be decreased by the frequency gap as shown in FIG. 12.

Observation 3: The −139 dBm/Hz noise level in PA is expected when the frequency gap is acquired with 153 MHz from the Tx band. Also when the 500 MHz frequency gap is considered, the guaranteed noise level may be −150 dBm/Hz in some NR operating bands.

Based on examples shows in FIG. 12, the expected de-sense level with −139 dBm noise level is derived as shown in Table 12.

TABLE 12

| NR band | n77 band | | |
| | Primary RX | | Diversity Rx |
| --- | --- | --- | --- |
| C/N requirement (dB) | −1.0 | | −1.0 |
| Total NF(IM + RF NF = 2.2 + 10.5) (dB) | 12.7 | | 12.7 |
| Noise floor at Antenna connector(dBm/Hz) | −161.3 | | −161.3 |
| PA & RFIC RX Band Noise level at Antenna connector (dBm/Hz) | −150.0 | (−139 + 3) dBm/Hz(PA + RFIC RxBN) − FEIL(4 dB) − Ant ISO(10 dB)) | −150.0 |
| Total RXBN at Antenna connector (dBm/Hz) | −149.7 | | −149.7 |
| Sensitivity with RXBN (dBm/10 MHz CBW) | −80.7 | | −80.7 |
| REFSENS After MRC | −83.7 | 11.6 dB De-sense level from −95.3 dBm | |

Table 12 shows an example of Expected De-sense level with the 153 MHz frequency gap in 10 MHz CBW (SCS 15 kHz). Herein, the frequency gap may mean frequency spacing value from an edge of Tx band.

As shown in the example of Table 12, REFSENS after MRC is −83.7 dBm. Based on Table 12, 11.6 dB of De-sense level is derived based on −95.3 dBm of Table 10.

Based on the Table 12, the reasonable MSD level is expected to be 11.6 dB when Tx/Rx frequency gap with 153 MHz in Band 12 is assumed to be applied for operating band n77. For example, MSD level may be equal to or less than 11.6 dB for simultaneous Rx/Tx operation when operating band n77 is used and frequency gap is equal to 153 MHz.

De-sense level with 500 MHz frequency gap in 10 MHz CBW is derived as shown in Table 13.

TABLE 13

| NR band | n77 band | | |
|---|---|---|---|
| | Primary RX | | Diversity Rx |
| C/N requirement (dB) | −1.0 | | −1.0 |
| Total NF(IM + RF NF = 2.2 + 10.5) (dB) | 12.7 | | 12.7 |
| Noise floor at Antenna connector(dBm/Hz) | −161.3 | | −161.3 |
| PA & RFIC RX Band Noise level at Antenna connector (dBm/Hz) | −161.0 | (−150 + 3) dBm/Hz(PA + RFIC RxBN) − FEIL(4 dB) − Ant ISO(10 dB)) | −161.0 |
| Total RXBN at Antenna connector (dBm/Hz) | −158.1 | | −158.1 |
| Sensitivity with RXBN (dBm/10 MHz CBW) | −89.1 | | −89.1 |
| REFSENS After MRC | −92.1 | 3.2 dB De-sense level from −95.3 dBm | |

Table 13 shows an example of Expected De-sense level with the 500 MHz frequency gap in 10 MHz CBW (SCS 15 kHz).

As shown in the example of Table 13, REFSENS after MRC is −92.1 dBm. Based on Table 13, 3.2 dB of De-sense level is derived based on −95.3 dBm of Table 10. For example, MSD level may be equal to or less than 3.2 dB for simultaneous Rx/Tx operation when operating band n77 is used and frequency gap is equal to 500 MHz.

Observation 4: Based on the above Table 12 and Table 13, 11.6 dB MSD with 153 MHz frequency gap and 3.2 dB MSD with 500 MHz frequency gap are derived, for a case in which simultaneous Rx/Tx capability is allowed in a NR operating band.

For reference, if frequency gap is not considered, 25.3 dB MSD may be applied.

Therefore, feasibility study whether to allow the simultaneous Rx/Tx capability in the intra-band NC-CA/DC UE and the detail MPR value and MSD level may be discussed to support simultaneous Rx/Tx capability based on the present disclosure.

Based on the above mentioned examples of observations, the present disclosures proposes the following examples of proposal.

First example of proposal: The self-interference problem needs to be studied when the simultaneous Rx/Tx capability is allowed for intra-band NC-CA/DC UE considering with the existing frequency gap between aggressor carrier and victim carrier.

Other solution can be further discussed to mitigate the desense level in victim carrier. Basically the uplink RB restriction and A-MPR approach or combination of these candidate solution may also be discussed to allow the simultaneous Rx/Tx capability.

Specially, A-MPR value may be applied on top of the frequency gap to optimize the system performance.

Observation 5: Combination of MSD and A-MPR approach can be used for optimizing the system performance for the simultaneous Rx/Tx capability intra-band NC-CA/DC UE.

Second example of Proposal: The frequency gap, UL RB restriction for REFSENS and A-MPR approach or combination of the candidate solutions needs to be studied to achieve the reasonable MSD values and cell coverage to keep the system performance.

1-2. Candidate Deployment Scenarios & Use Case

Figure 13:
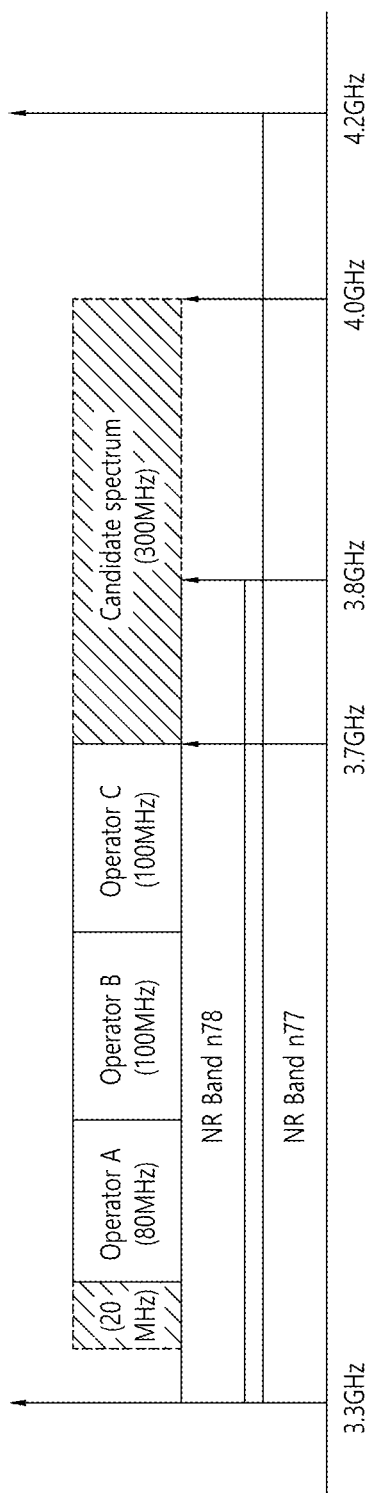
FIG. 13 shows an example of deployment scenarios for intra-band NC CA/DC UE operation.

As mentioned in session 1-1, there is a need to clarify the candidate deployment scenarios & use cases. The following shows examples of deployment scenarios and use cases.

a) Deployment Scenarios a-1) Intra-Band NC-CA/DC UE with Wide Frequency Gap (in FIG. 13)

The following drawings are prepared to explain a specific example of the present specification. Since the names of specific devices or names of specific signals/messages/fields described in the drawings are provided by way of example, technical features of the present specification are not limited to specific names used in the following drawings.

FIG. 13 shows an example of deployment scenarios for intra-band NC CA/DC UE operation.

Following examples show detailed explanation for FIG. 13.

Herein, NC CA/DC may mean non-contiguous intra-band NR CA or non-contiguous intra-band EN-DC.

a-1-i) Focus on the single operator usage with the existing n77 band+new candidate band in n77.

Operator A+new band (intra-band NC-CA)

Operator B+new band (intra-band NC-CA)

Figure 14:
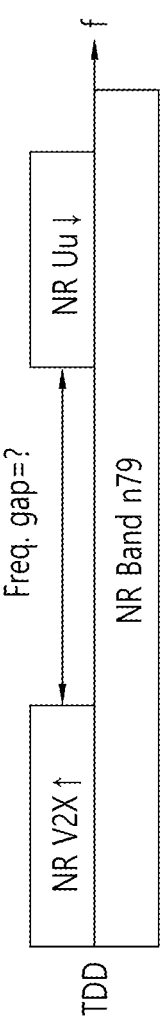
FIG. 14 shows an example of use cases for intra-band con-current V2X operation.

Operator C+new band (only consider the intra-band NC-CA)

a-1-ii) For the inter operator deployment scenarios, simultaneous Rx/Tx capability may be allowed for the specific scenarios such as the Indoor-to-Macro scenarios and Indoor-to-Indoor scenarios. The Macro-to-Marco scenarios will be precluded due to cross link interference problem. For example, Macro may mean coverage within a radius of 35 km (5~30 km). Because the outdoor coverage is usually large, the base station provides service with high transmission power. Indoor literally covers only the interior (Base stations located indoors have low transmission power.). Indoor-to-macro means that Carrier #1(or #2) is being serviced indoors, and Carrier #2(or #1) is being serviced outdoors. In Macro to Macro, two carrier users are each served by a high power base station, and since the coverage of each base station is also wide, there is a high probability that each other will cause interference (Cross link interference problem). Scenarios other than this scenario have a low probability of interfering with each other even when concurrent TxRx services are served.

a-2) Intra-Band Con-Current V2 UE (SL+NR Uu in Different Carriers) with Wide Frequency Gap (in FIG. 14)

The following drawings are prepared to explain a specific example of the present specification. Since the names of specific devices or names of specific signals/messages/fields described in the drawings are provided by way of example, technical features of the present specification are not limited to specific names used in the following drawings.

FIG. 14 shows an example of use cases for intra-band con-current V2X operation.

FIG. 14 shows an example of use cases for intra-band con-current V2X operation within non-adjacent carrier. Following examples show detailed explanation for FIG. 14.

a-2-i) CC1 (SL operation)+CC2 (NR Uu operation): Synchronous operation is baseline a-2-ii) If the simultaneous Rx/Tx capability is allowed for NR Uu, then the simultaneous Rx/Tx capability can be considered for NR SL in intra-band The operating scenario in FIG. 13 is extended from the simultaneous Rx/Tx capability for inter-band CA/DC UE. This operation may be applied for the CA/DC without any cancellation schemes in UE side.

In FIG. 14, this operating scenarios are motivated from conventional SL enhancements. Where Uu+PC5 SL can be operated concurrently in an intra-band con-current operating band and thus simultaneous Tx/Rx can supported under this scenario. The simultaneous Rx/Tx capability scenario may be discussed in the general NR Uu session first. Then, SL can be considered the conclusion in NR Uu operation.

Based on the self-interference analysis in session 1-1, the reasonable MSD level with frequency gap may be achieved. In addition, the uplink RB restriction and A-MPR approach may also be considered to mitigate the self desense problems.

From the detail deployment scenarios and use case, the present disclosure proposes the following:

Third example of Proposal: Based on the candidate deployment scenarios in FIG. 13 and FIG. 14, feasibility study whether allowing the simultaneous Rx/Tx capability UE in intra-band NC-CA/DC UE may be discussed.

1-3. Examples of Issues to Support Simultaneous Rx/Tx Capability in Intra-Band NC-CA/DC UE Specially, the expected Tx power level in primary Rx path and Diversity Rx path may be considered as shown in FIG. 15.

The following drawings are prepared to explain a specific example of the present specification. Since the names of specific devices or names of specific signals/messages/fields described in the drawings are provided by way of example, technical features of the present specification are not limited to specific names used in the following drawings.

Figure 15:
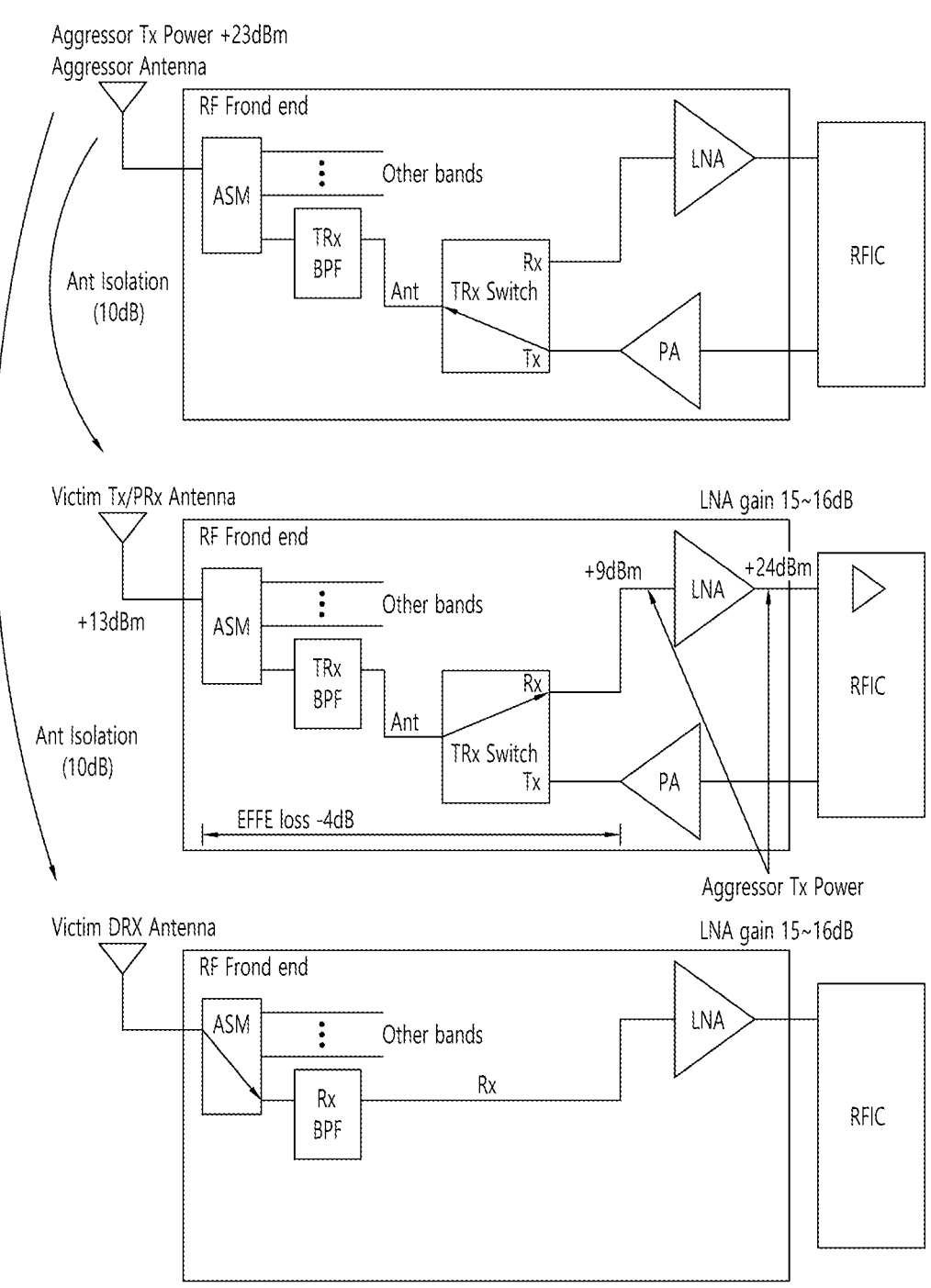
FIG. 15 shows an example of aggressor Tx power level in Rx antennas in 2Tx/2PA reference RF architecture.

FIG. 15 shows an example of aggressor Tx power level in Rx antennas in 2Tx/2PA reference RF architecture.

FIG. 15 shows an example of aggressor Tx power level in primary Rx antennas and diversity Rx antennas in the 2Tx/2PA reference RF architecture. DRX Antenna may mean Diversity Rx antenna. PRx Antenna may mean primary Rx antenna.

As shown in FIG. 13, 10 dB of antenna isolation is applied between each antennas.

In here, the estimated Tx interference power level will be derived based on 23−10−4=9 dBm at LNA input and 23−10−4+15=24 dBm at RFIC input. For example, as shown in Victim Tv/PRx Antenna, received power level becomes +13 dBm because Agressor Tx Power +23 dBm is decreased based on 10 dB of antenna isolation. From Victim Antenna to LNA, −4 dB of RFFE loss is applied to +13 dBm. Thus, input power level of LNA is +9 dBm. Based on LNA gain 15 dB, the estimated Tx interference power level is derived to be +24 dBm.

The ranged power level cannot allowed in LNA and RFIC in Rx paths since the maximum allowed input level of a common LNA is 4 dBm as shown in FIG. 16.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 16 shows an example of absolute maximum rating for LNA.

FIG. 16 shows the example of parameters used for LNA.

Also the 24 dBm output power is not allowed for the input power level of the RFIC.

Therefore, the saturation problem in these Rx path due to the high input power needs to be solved.

The followings are four examples of solutions.

First solution is to enhance the allowed maximum input level of the LNA and RFIC as component perspective. When the RFIC and LNA allow higher input level by state-of-art technology, this problem is easily addressed and support simultaneous Rx/Tx capability.

The second solution is to allow Additional Maximum Power Reduction (A-MPR) approach for the simultaneous Rx/Tx capability UE. When A-MPR value up to 4~7 dB is considered on top of MPR value, then the saturation problem can be solved and required MSD level is also relaxed by A-MPR values.

Figure 17:
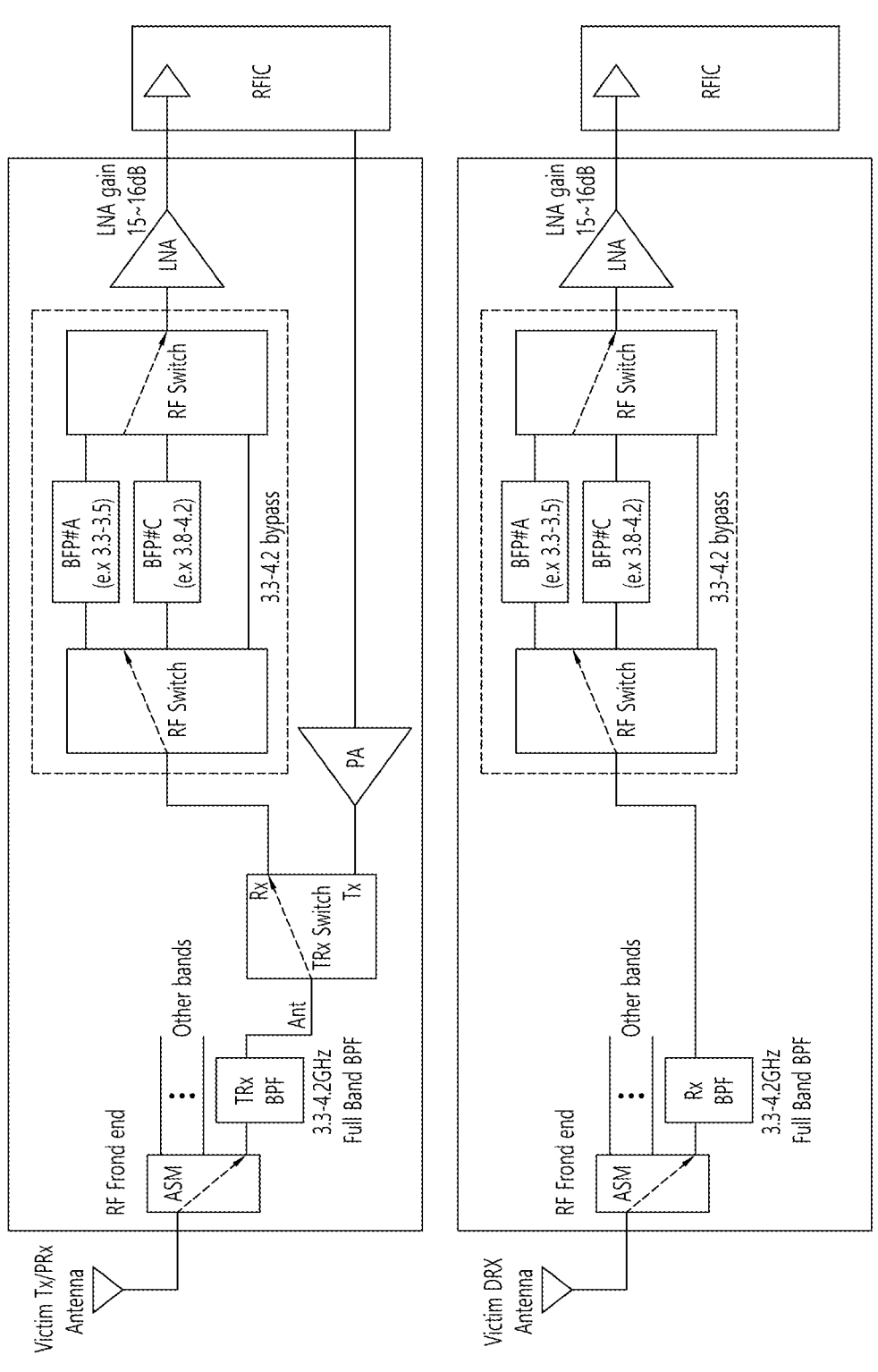
FIG. 17 shows an example of solution to eliminate the unwanted Tx signal in Rx path.

The third solution is to add the band pass filter within block with dotted lines to eliminate the unwanted Tx signal from the aggressor as shown in FIG. 17.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 17 shows an example of solution to eliminate the unwanted Tx signal in Rx path.

FIG. 17 shows an example of Candidate solution(i.e. the third solution) to eliminate the unwanted Tx signal in Rx path.

As mentioned above, compared to the example shown in FIG. 16, band pass filter is added within the block with dotted lines.

Figure 18:
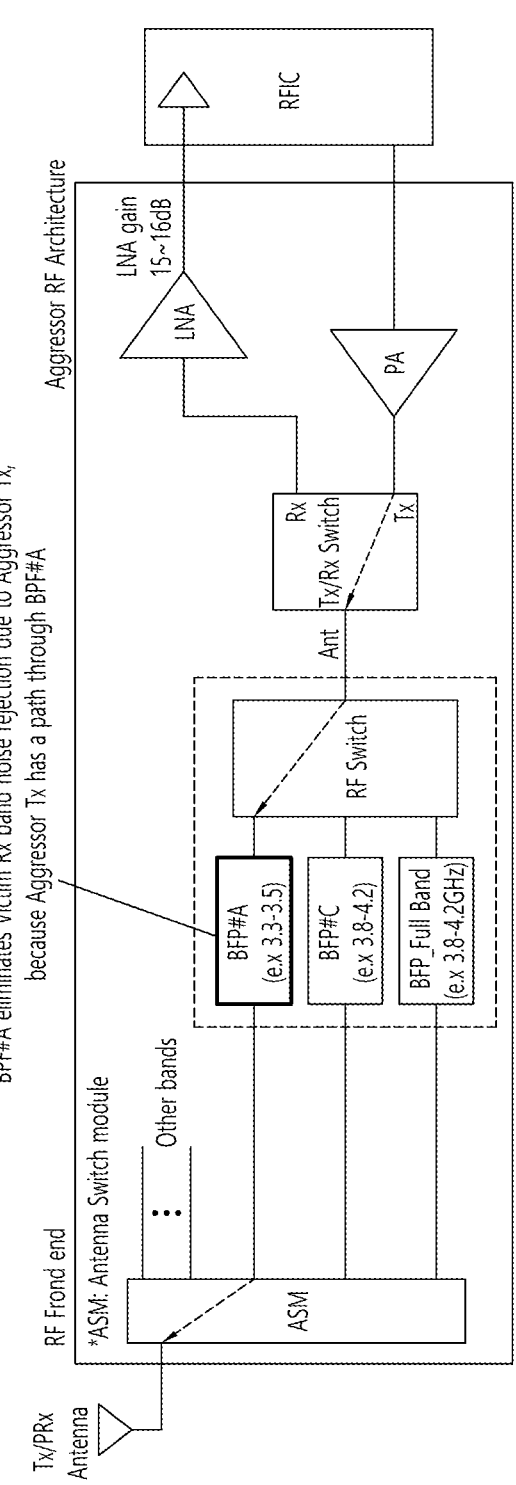
FIG. 18 shows an example of Tx RF chain to eliminate the unwanted noise in Rx path.
Figure 19:
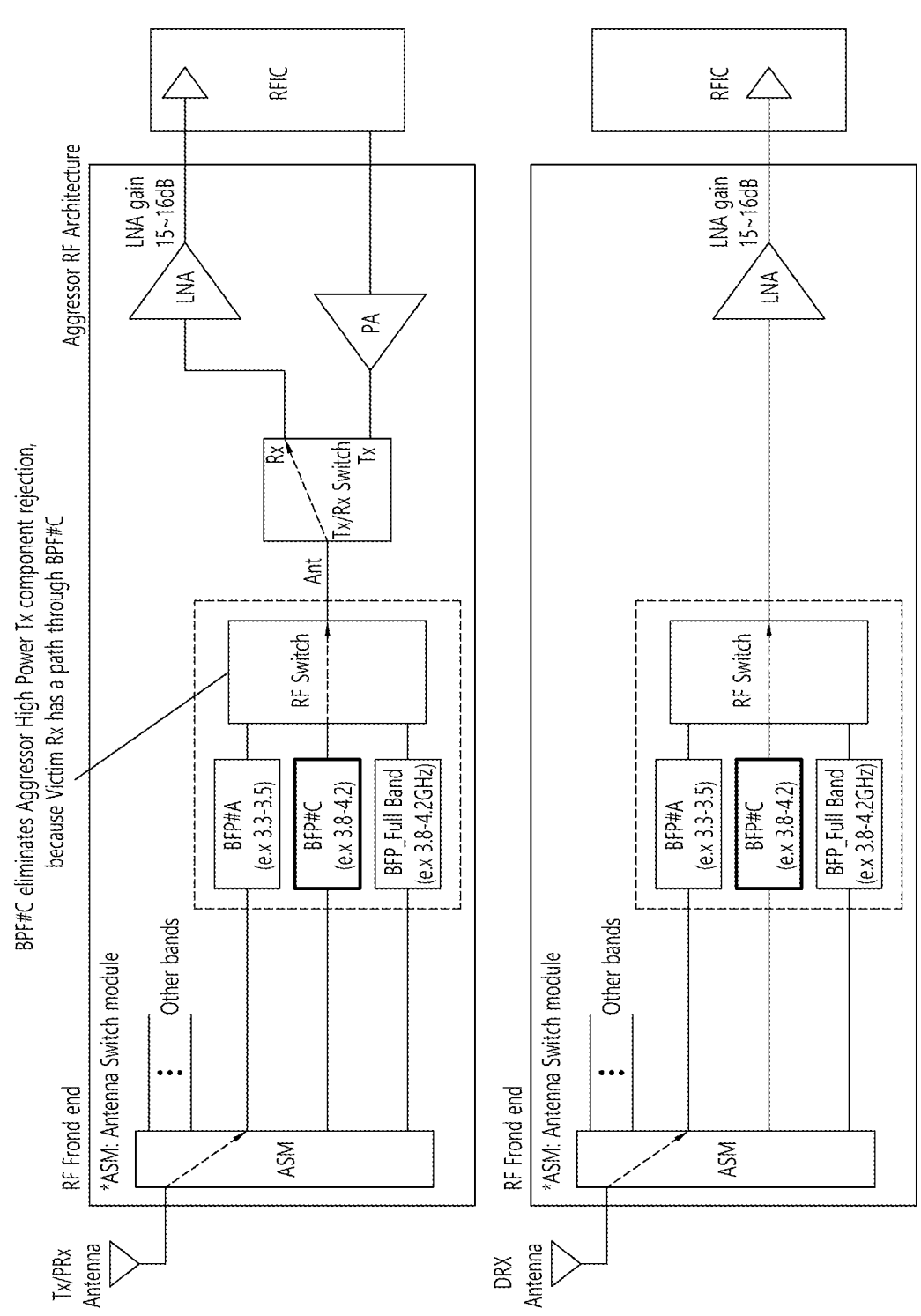
FIG. 19 shows an example of Rx RF chain to eliminate the unwanted noise in Rx path.

Another filter solution (i.e. the fourth solution) is shown in FIG. 18 and FIG. 19. For reference, FIG. 18 shows an example of Tx RF chain and FIG. 19 shows Rx RF chain in one device.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 18 shows an example of Tx RF chain to eliminate the unwanted noise in Rx path. FIG. 19 shows an example of Rx RF chain to eliminate the unwanted noise in Rx path.

FIG. 18 and FIG. 19 show candidate solution (i.e. fourth solution) to eliminate the unwanted Tx signal in Tx/Rx path. FIG. 18 shows the example of Tx RF chain to eliminate the unwanted noise in Rx band. FIG. 19 shows the example of (b) Rx RF chain to eliminate the unwanted signal in Rx band.

In FIG. 18, the Tx signal will be passed with BPF #A, and the aggressor Tx noise level in other frequencies will be rejected by BPF #A.

Also, as shown in FIG. 19, the wanted Rx signal level will be passed with BPF #C, and the aggressor Rx noise in other frequencies will be rejected by BPF #C.

Therefore, the proposed RF architecture with filter in both Tx/Rx path in FIG. 18 and FIG. 19 will reject the unwanted noise signal level in Tx/Rx path and also just passes the wanted signal levels in Rx path.

Therefore, at least one of 4 candidate solutions may be applied to support simultaneous Rx/Tx capability in intra-band NC-CA/DC UE.

Hereinafter, descriptions in section 1-1 to 1-3 are summarized as the following examples:

In this paper, we provide our view on the simultaneous Rx/Tx capability for intra-band NC-CA/DC UE with wide frequency gap between CC#1 and CC#2. Based on the candidate deployment scenarios in session 3, RAN4 can study the feasibility on the simultaneous Rx/Tx capability.

Observation 1: 25.3 dB MSD is expected in n77 TDD band, when total noise level with −122 dBm (PA+RFIC) was considered without duplexer isolation.

Observation 2: The noise level can be decreased by the frequency gap as shown in FIG. 12.

Observation 3: The −139 dBm/Hz noise level in PA is expected when the frequency gap is acquired with 153 MHz from the Tx band. Also when the 500 MHz frequency gap is considered, the guaranteed noise level may be −150 dBm/Hz in some NR operating bands.

Observation 4: Based on the above Table 12 and Table 13, 11.6 dB MSD with 153 MHz frequency gap and 3.2 dB MSD with 500 MHz frequency gap are derived, for a case in which simultaneous Rx/Tx capability is allowed in a NR operating band.

Observation 5: Combination of MSD and A-MPR approach can be used for optimizing the system performance for the simultaneous Rx/Tx capability intra-band NC-CA/DC UE.

Based on the above observations, the present disclosure proposes as following:

First Example of Proposal: The self-interference problem needs to be studied when the simultaneous Rx/Tx capability is allowed for intra-band NC-CA/DC UE considering with the existing frequency gap between aggressor carrier and victim carrier.

Second Example of Proposal: The frequency gap, UL RB restriction for REFSENS and A-MPR approach or combination of the candidate solutions needs to be studied to achieve the reasonable MSD values and cell coverage to keep the system performance.

Third Example of Proposal: Based on the candidate deployment scenarios in FIG. 13 and FIG. 14, feasibility study whether allowing the simultaneous Rx/Tx capability UE in intra-band NC-CA/DC UE may be discussed.

Fourth Example of Proposal: To eliminate the unwanted Tx signal in Rx path, at least one of 4 candidate solutions (e.g. following Option 1 to 4) may be considered to support the simultaneous Rx/Tx capability in intra-band NC-CA/DC UE Option 1: Enhance the allowed maximum input level of the LNA and RFIC as component perspective Option 2: Allow A-MPR approach. The 4~7 dB A-MPR will be applied on top of MPR value.

Option 3: Add the band pass filter within red block to eliminate the unwanted Tx signal from the aggressor as shown in FIG. 17.

Option 4: Also add BPF in both Tx/Rx path in FIGS. 18 and 19 to eliminate unwanted Tx/Rx noise signal in both Tx/Rx path and just passed the wanted signal levels in Rx path.

Figure 20:
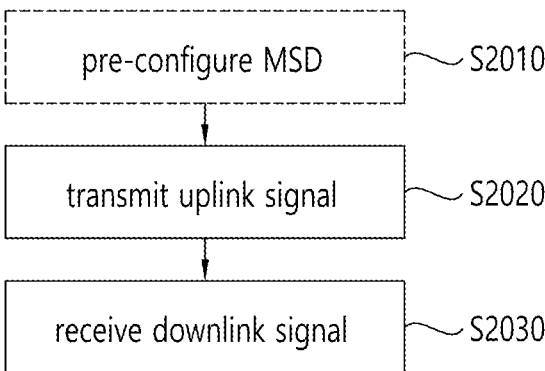
FIG. 20 is a flow chart showing an example of a procedure of a UE according to the present disclosure.

Hereinafter, FIG. 20 illustrates an example of an operation performed by the UE.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 20 is a flow chart showing an example of a procedure of a UE according to the present disclosure.

Referring to FIG. 20, steps S2010 to S2030 are shown. Operations described below may be performed by the UE (for example, the first device 100 of FIG. 2).

For reference, step S2010 may not always be performed when the UE performs communication. For example, step S2010 may be performed only when the reception performance of the UE is tested. For example, step S2010 may not be performed by the UE and MSD may be pre-configured by manufacturers of the UE.

For reference, the order in which steps S2020 and S2030 are performed may be different from that shown in FIG. 20. For example, step S2030 may be performed first and then step S2020 may be performed. Alternatively, step S2020 and step S2030 may be performed simultaneously. Alternatively, the time when step S2020 and step S2030 may be may overlap partially.

Based on examples shown in FIG. 20, the UE supports simultaneous Rx/Tx operation. The UE may be configured to use TDD operating band n77 for performing communication, such as Uu communication and/or V2X SL communication. The UE may be configured to use UL frequency band and DL frequency band in the same TDD operating band n77, based on that the UE supports simultaneous Rx/Tx operation.

In step S2010, the UE may pre-configure MSD value. The MSD value may be pre-configured based on examples of Table 10 to Table 13. For example, pre-configured MSD values may be equal to or less than MSD values shown in Table 10 to Table 13. For example, MSD value may be pre-configured to be equal to or less than 25.3 dB.

The predetermined value of MSD for the simultaneous Rx/Tx operation is predetermined based on a frequency gap between the first CC and the second CC. For example, MSD value may be pre-configured to be equal to or less than 11.6 dB for simultaneous Rx/Tx operation when operating band n77 is used and frequency gap is equal to 153 MHz. For example, MSD value may be pre-configured to be equal to or less than 3.2 dB for simultaneous Rx/Tx operation when operating band n77 is used and frequency gap is equal to 500 MHz. The frequency gap may be defined based on a difference between a lower edge of the second CC and upper edge of the first CC. Herein the second CC is based on higher frequency than the first CC.

Before performing step S2020 or S2020, the UE may receive a capability enquiry message from a serving cell. The UE may transmit a capability information to the serving cell, based on that the capability enquiry message is received. The capability information includes that the UE supports simultaneous Reception (Rx) and Transmission (Tx) (Rx/Tx) operation for intra-band.

In step S2020, the UE may transmit the uplink signal. For example, the UE may transmit the uplink signal based on CC within a NR TDD operating band, such as operating band n77.

In step S2030, the UE may receive the downlink signal. For example, the UE may receive the downlink signal based on second CC within NR TDD operating band, such as operating band n77.

The reception of the downlink signal and the transmission of the uplink signal is simultaneously performed within the NR TDD operating band, based on that the simultaneous Rx/Tx operation for intra-band is supported by the UE.

The UE may receive the downlink signal based on the reference sensitivity of the downlink band, to which the MSD value (for example, MSD values shown in examples of Table 10 to Table 13) is applied.

For example, the UE may be configured to use CA or DC based on NR TDD operating band n77. For example, the predetermined value of MSD is equal to or less than 11.6 dB, based on that the frequency gap is equal to 153 MHz. For example, the predetermined value of MSD is equal to or less than 3.2 dB, based on that the frequency gap is equal to 500 MHz.

Hereinafter, an apparatus(for example, UE) in a wireless communication system, according to some embodiments of the present disclosure, will be described.

For example, the apparatus may include at least one processor, at least one transceiver, and at least one memory.

For example, the at least one processor may be configured to be coupled operably with the at least one memory and the at least one transceiver.

For example, the processor may be configured to perform operation comprising: receiving a capability enquiry message from a serving cell; transmitting a capability information to the serving cell, based on that the capability enquiry message is received; and transmitting an uplink signal based on first CC within a NR TDD operating band; and receiving a downlink signal based on second CC within NR TDD operating band.

Hereinafter, a processor for in a wireless communication system, according to some embodiments of the present disclosure, will be described.

For example, the processor may be configured to perform operation comprising:

receiving a capability enquiry message from a serving cell; transmitting a capability information to the serving cell, based on that the capability enquiry message is received; and transmitting an uplink signal based on first CC within a NR TDD operating band; and receiving a downlink signal based on second CC within NR TDD operating band.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE.

For example, the stored a plurality of instructions may cause the UE to perform operationg comprising: obtaining a capability enquiry message: generating a capability information, based on that the capability enquiry message is obtained; and generating an uplink signal based on first Component Carrier (CC) within a New Radio (NR) TDD operating band; and obtaining a downlink signal based on second CC within NR TDD operating band.

According to some embodiment of the present disclosure, Rx/Tx operating based on TDD operating band may be performed efficiently and/or precisely. For example, simultaneous Rx/Tx operation is efficiently supported based on MSD values, capability information, deployment scenarios, and/or RF components. For example, frequency efficiency is achieved for simultaneous Rx/Tx operation and resources can be efficiently used. For example, interference between carriers may not cause a significant problem. In this case, if simultaneous Rx/Tx capability is configured for the wide band such as n77 and n79, the frequency efficiency of the system becomes very good, and resources can be used flexibly.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s)

can be combined to be implemented or performed in a method. Other implementations are within the scope of the following claims.

What is claimed is:

1. A User Equipment (UE) configured to operate in a wireless system, the device comprising:

at least one transceiver;

at least one processor; and at least one computer memory operably connectable to the at least one processor and storing instructions that, based on being executed by the at least one processor, perform operations comprising:

receiving a capability enquiry message from a serving cell;

transmitting a capability information to the serving cell, based on that the capability enquiry message is received; and transmitting an uplink signal based on first Component Carrier (CC) within a New Radio (NR) TDD operating band; and receiving a downlink signal based on second CC within NR TDD operating band, wherein a value of Maximum Sensitivity Degradation (MSD) is applied to a reference sensitivity used for the receiving of the downlink signal, wherein the capability information includes that the UE supports simultaneous Reception (Rx) and Transmission (Tx) (Rx/Tx) operation for intra-band, wherein first CC and second CC within the NR TDD operating band are configured for the simultaneous Rx/Tx operation for intra-band, and wherein the value of MSD for the simultaneous Rx/Tx operation is based on a frequency gap between the first CC and the second CC.

2. The UE of claim 1, wherein the NR TDD operating band is NR operating band n77, and wherein the NR operating band n77 includes frequency range of 3300 MHz to 4200 MHz for an uplink operating band and downlink operating band.

3. The UE of claim 1, wherein the reception of the downlink signal and the transmission of the uplink signal is simultaneously performed within the NR TDD operating band, based on that the simultaneous Rx/Tx operation for intra-band is supported by the UE.

4. The UE of claim 1, wherein the value of MSD is equal to or less than 11.6 dB, based on that the frequency gap is equal to 153 MHz.

5. The UE of claim 1, wherein the value of MSD is equal to or less than 3.2 dB, based on that the frequency gap is equal to 500 MHz.

6. The UE of claim 1, wherein the frequency gap is defined based on a difference between a lower edge of the second CC and upper edge of the first CC, and wherein the second CC is based on higher frequency than the first CC.

7. A method for performing communication, the method performed by a User Equipment (UE) and comprising:

receiving a capability enquiry message from a serving cell;

transmitting a capability information to the serving cell, based on that the capability enquiry message is received; and transmitting an uplink signal based on first Component Carrier (CC) within a New Radio (NR) TDD operating band; and receiving a downlink signal based on second CC within NR TDD operating band, wherein a value of Maximum Sensitivity Degradation (MSD) is applied to a reference sensitivity used for the receiving of the downlink signal, wherein the capability information includes that the UE supports simultaneous Reception (Rx) and Transmission (Tx) (Rx/Tx) operation for intra-band, wherein first CC and second CC within the NR TDD operating band are configured for the simultaneous Rx/Tx operation for intra-band, and wherein the value of MSD for the simultaneous Rx/Tx operation is based on a frequency gap between the first CC and the second CC.

8. The method of claim 7, wherein the NR TDD operating band is NR operating band n77, and wherein the NR operating band n77 includes frequency range of 3300 MHz to 4200 MHz for an uplink operating band and downlink operating band.

9. The method of claim 7, wherein the reception of the downlink signal and the transmission of the uplink signal is simultaneously performed within the NR TDD operating band, based on that the simultaneous Rx/Tx operation for intra-band is supported by the UE.

10. The method of claim 7, wherein the value of MSD is equal to or less than 11.6 dB, based on that the frequency gap is equal to 153 MHz.

11. The method of claim 7, wherein the value of MSD is equal to or less than 3.2 dB, based on that the frequency gap is equal to 500 MHz.

12. The method of claim 7, wherein the frequency gap is defined based on a difference between a lower edge of the second CC and upper edge of the first CC, and wherein the second CC is based on higher frequency than the first CC.

13. A device operating in a wireless communication system, the wireless device comprising:

at least processor; and at least one computer memory operably connectable to the at least one processor and storing instructions that, based on being executed by the at least one processor, perform operations comprising:

obtaining a capability enquiry message;

generating a capability information, based on that the capability enquiry message is obtained; and generating an uplink signal based on first Component Carrier (CC) within a New Radio (NR) TDD operating band; and obtaining a downlink signal based on second CC within NR TDD operating band, wherein a value of Maximum Sensitivity Degradation (MSD) is applied to a reference sensitivity used for the receiving of the downlink signal, wherein the capability information includes that the device supports simultaneous Reception (Rx) and Transmission (Tx) (Rx/Tx) operation for intra-band, wherein first CC and second CC within the NR TDD operating band are configured for the simultaneous Rx/Tx operation for intra-band, and wherein the value of MSD for the simultaneous Rx/Tx operation is based on a frequency gap between the first CC and the second CC.

* * * * *